(12) United States Patent  (10) Patent No.: US 8,333,108 B2
Lorentz et al.  (45) Date of Patent: *Dec. 18, 2012

(54) DETECTION SYSTEM FOR LOCALIZING DEFECTIVE SEALS IN HEAT EXCHANGERS

(75) Inventors: Jay Lorentz, Shelbyville, IN (US); Stephen Gunn, Indianapolis, IN (US); Eric Leroy, Rochester Hills, MI (US); Nicolas Lelievre, Lake Orion, MI (US)

(73) Assignee: Valeo, Inc., Auburn Hills, MI (US)

( * ) Notice: Subject to any disclaimer, the term of this patent is extended or adjusted under 35 U.S.C. 154(b) by 1080 days.

This patent is subject to a terminal disclaimer.

(21) Appl. No.: 11/629,427

(22) PCT Filed: Jun. 30, 2005

(86) PCT No.: PCT/US2005/023170
§ 371 (c)(1), (2), (4) Date: Jan. 21, 2009

(87) PCT Pub. No.: WO2006/004866
PCT Pub. Date: Jan. 12, 2006

(65) Prior Publication Data
US 2009/0126517 A1   May 21, 2009

Related U.S. Application Data

(63) Continuation-in-part of application No. 10/881,551, filed on Jun. 30, 2004, now Pat. No. 7,497,245.

(60) Provisional application No. 60/623,084, filed on Oct. 28, 2004.

(51) Int. Cl.
    *G01M 3/04* (2006.01)

(52) U.S. Cl. .......................................... 73/49.8
(58) Field of Classification Search ............... 73/49.8; 165/175
    See application file for complete search history.

(56) References Cited

U.S. PATENT DOCUMENTS

| | | | |
|---|---|---|---|
| 4,372,374 A | 2/1983 | Lee | 165/70 |
| 4,997,035 A | 3/1991 | Beatenbough et al. | 165/173 |
| 5,899,267 A | 5/1999 | Kroetsch et al. | 165/173 |
| 6,192,583 B1 | 2/2001 | Roffelsen | 29/890.036 |
| 6,942,014 B2 * | 9/2005 | Bonnet | 165/11.1 |
| 2005/0103468 A1 * | 5/2005 | Lorentz et al. | 165/70 |

FOREIGN PATENT DOCUMENTS

| | | |
|---|---|---|
| DE | 35 44 588 A1 | 6/1987 |
| EP | 571263 | 4/1996 |
| JP | 60023790 | 6/1985 |
| JP | 10197188 | 7/1998 |

* cited by examiner

*Primary Examiner* — Peter MacChiarolo
*Assistant Examiner* — Tamiko Bellamy
(74) *Attorney, Agent, or Firm* — Dierker & Associates, P.C.

(57) ABSTRACT

The present invention relates to the field of automotive heat exchanger assemblies, and, in particular, assemblies with cores with headers and end tanks and/or male and female connections. The present invention also relates to a method of making a positive leak path to determine leaks prior to employment of heat exchanger assembles. The present invention further relates to a method of determining whether or not a leak seal is temporary by providing a positive leak path at the point of assembly or initial evaluation or testing a heat exchanger.

21 Claims, 20 Drawing Sheets

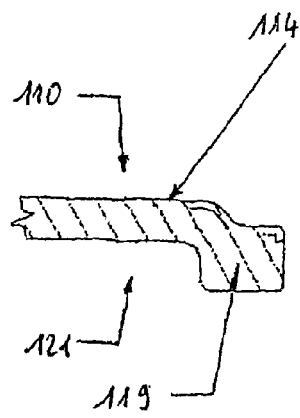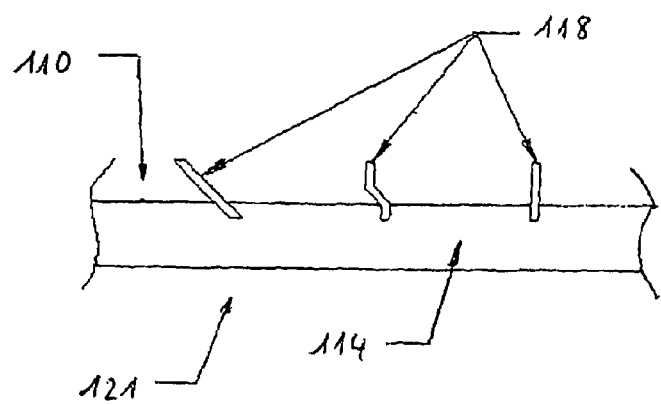
FIG. 11a  FIG. 11b
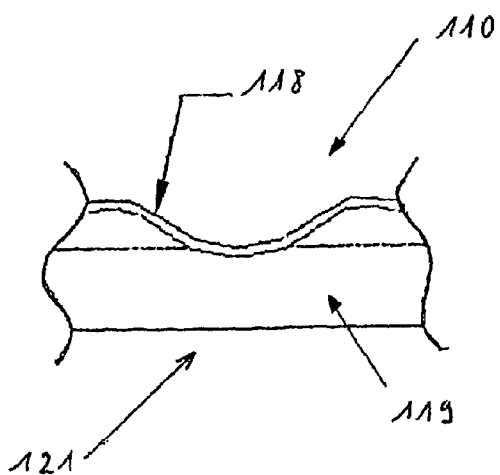
FIG. 11c

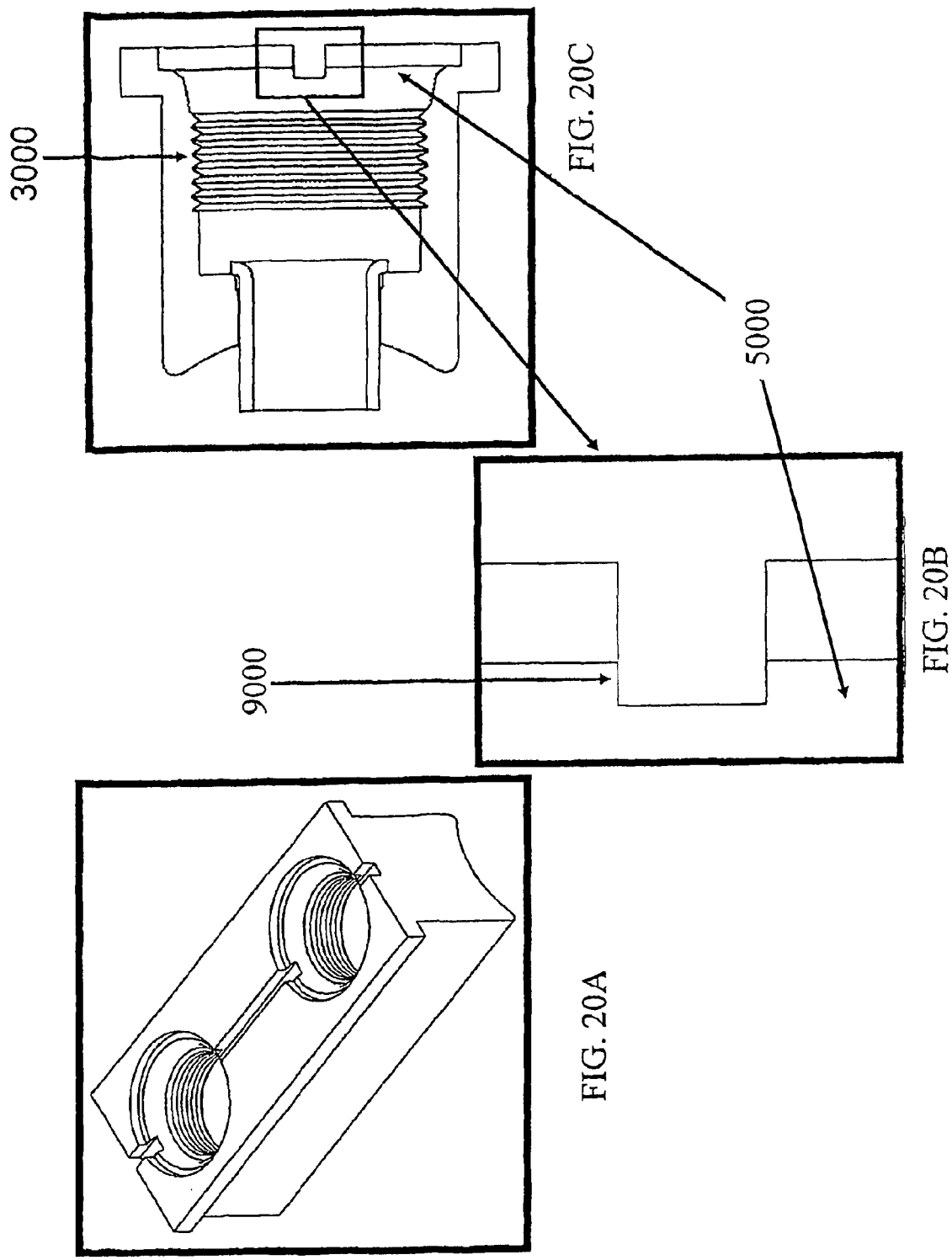

DETECTION SYSTEM FOR LOCALIZING DEFECTIVE SEALS IN HEAT EXCHANGERS

CROSS REFERENCE TO RELATED APPLICATIONS

This application is a 35 U.S.C. §371 national stage filing of PCT application Ser. No. PCT/US2005/023170, filed Jun. 30, 2005, which itself claimed priority to U.S. application Ser. No. 10/881,551, filed Jun. 30, 2004 (now U.S. Pat. No. 7,497,245, issued Mar. 3, 2009) and to U.S. Provisional Patent Application Ser. No. 60/623,084, filed Oct. 28, 2004. This application is a continuation-in-part of U.S. application Ser. No. 10/881,551, filed Jun. 30, 2004 (now U.S. Pat. No. 7,497,245).

FIELD OF INVENTION

The present invention relates to the field of automotive heat exchanger assemblies, and, in particular, heat exchangers with tank and header assemblies or connections and seals between such assemblies. The present invention also relates to a method of making a positive leak path to determine and localize eventual leaks prior to customer assembly plant testing or end customer usage of the heat exchanger.

BACKGROUND OF THE INVENTION

Automotive heat exchanger assemblies commonly have a core comprising tubes, separators or fins, and side plates made of some type of metal, such as aluminum, and associated headers. These heat exchangers also comprise end tanks or manifolds made of plastic or metal. The purpose of the header is to attach the end tank or manifold firmly to the core portion of the heat exchanger. To provide for efficient heat exchange and to avoid potentially overheating due to loss of thermal liquid or gas within the heat exchanger, the tank to header joints must be essentially leak-proof. Typically the tank to header joints are made 'leak tight' by providing for a seal, such as a rubber gasket, between the header and the tank.

The problem with current designs is that the gasket, and, in particular, the rubber gasket often used between the header and the tank, is often misaligned or otherwise improperly positioned, either due to improper assembly procedures or faulty design of seal or gasket. Such a misalignment is often not detectable at the first stages of assembly or testing, due to the fact that the location of the seal is not visible on external examination. Detection of the misalignment is made more difficult since the seal, though incorrect or incomplete, may make the tank to header joint appear to be leak proof and the heat exchanger may appear to be functioning properly, due to the fact that the misalignment or otherwise improper positioning of the gasket lead to it somehow being 'wedged' or 'pinched' in place during assembly, leading to the formation of a temporary seal. Since this temporary seal may be capable of lasting through traditional leak testing procedures performed after initial assembly at the manufacturing facility, the fact that it is defective vis-à-vis its use in the normal heat exchanger operating environment, may not be apparent until the heat exchanger is shipped to a customer assembly plant for further processing, or even during vehicle use by the end customer, which can lead to disastrous consequences.

One approach to solving this problem is illustrated in U.S. Pat. No. 5,899,267, which adds ribs which project from the interior wall of the end tank in order to hold in a gasket that is incorrectly positioned so that it can form a seal, while nevertheless, allowing the defective or not properly assembled joint gasket to exist and to hold back or contain fluid. The ribs may also prevent an inappropriately positioned gasket from being displaced during initial leak testing, to prevent the catastrophic loss of fluid. In addition, inappropriately positioned and/or pinched gaskets can have resultant tears and/or induced gasket surface defects or flaws, that reduce the life of the seal, and, thus, the effective lifetime of the heat exchanger assembly. The solution of U.S. Pat. No. 5,899,267 may, therefore, lead to the unexpected effect of shipping parts, with improperly positioned gaskets and/or other defects or flaws, to the customer or end consumer.

The heat exchanger assemblies of the present invention, with means to detect temporary seals at the tank to header joint, as described below, have not been described in this prior art.

Heat exchangers also often have connections or fittings areas where a fluid connection exists between assemblies. The problem with most prior art fittings is that the fittings may not be leak-tight or leak proof in that fluid (gasses or liquids) in the system that pass through the fitting are able to leak or escape in an undesirable fashion. The fittings most common in the prior art consist of a male or portion to be inserted into a female or receiving portion for the inserted or male portion. An example of prior art fittings can be found in numerous sources, including standard SAE specifications.

SAE J1926-1 and J1926-2, for example, illustrate a fluid connection fitting with the female and male portions or end portions of a fluid connection (See FIGS. 1 & 2). The male fitting portion (male portion of the fitting) has grooves or threads (2) that match up, interrelate or interlock with grooves or threads on a female fitting portion (female portion of the fitting) to retain and/or maintain the two portions in interlocking or interrelated contact. The fluid connection fitting further has a rubber compound O-ring that is located between or against the male and female fitting portions such that it forms a seal so that fluid (liquid or gas) cannot escape from the joint (6) formed at the male and female fitting portions. The male and female fitting portions are both metal or metallic alloy components that are manufactured to fit tightly or snugly when placed in their proper positions, with the O-ring insuring the 'complete' seal.

U.S. Pat. No. 4,372,374A, EP571263A1, and U.S. Pat. No. 6,192,583 disclose attempts to direct and control the path of fluids that are capable of leaking at connections or fitting areas. These applications are drawn to heat exchangers, and, in particular, heat exchangers that contain more than one fluid, and attempt to keep fluids, when different, from inappropriately mixing if one or more portions of the heat exchanger itself should experience a fluid leak. In particular, a 'leak path' is created that can direct or control the fluid to prevent such inappropriate mixing of fluids.

Another example of the use of a leak path is found in JP10197188A. A supplemental 'hole' is located on the heat exchanger so that if the heat exchanger's individual component parts are not correctly assembled, and, therefore, an inappropriate leak of fluid somewhere occurs, some fluid will be detected at the area of the hole, and, subsequently, the heat exchanger will not pass standard leak test set up to ensure that no inappropriate leaks occur prior to sending out for its final use. Use of such a leak path in this disclosure is particularly pertinent to joints, and, specifically, brazed joints.

As described above, in a typical prior art threaded fitting with a rubber O-ring seal connection, the metal or metallic alloy portions of the male and female fitting portions are built to fit snugly when in their proper position, with the rubber O-ring providing the 'complete' or leak tight or proof seal. The connection fitting is designed so that the leak tight or proof seal is verified by standard leak test methods prior to being sent out for its final use or validated as meeting specification requirements. The test would then confirm that the complete seal has been achieved and that the heat exchanger could now be shipped to the end customer.

SUMMARY OF THE INVENTION

In aspects of the present invention, a heat exchanger comprising a core, a header, end tanks, and a tank to header joint, wherein the tank to header joint comprises a seal, and, in particular, a seal formed by a sealing means such as a gasket, and the end tank or header further comprises at least one means for detecting a temporary seal, preferably a channel or groove, and, preferably, a plurality of channels or grooves, is described. In additional aspects of the present invention, a channel or groove is provided that can detect joints where no seal is provided by a sealing means, however, a false seal leading to a 'defective joint' occurs when fabricated. In a joint comprising a male and a female, the contact areas or mating surfaces of the male and female portion of the connector, the portions are basically continuous, particularly in the area of metal surfaces of the joint. The continuity is broken in the area of placement of the sealing means, such as an O-ring or gasket or the like. The O-ring, for example, when properly placed, blocks the movement of fluid between or in between surfaces that normally should remain fluid free.

The one or more than one (plurality) of channels or grooves is designed to create a leak path (positive leak path) so that an inappropriate, incomplete or 'temporary seal' can be detected upon testing, even where it is not visibly identified during or just after its initial manufacture. A so called 'pinched gasket', wherein the gasket is inappropriately, incompletely or misaligned, can occur leading to a temporary seal in various cases scenarios. In aspects where a false seal occurs, the leak path detects the default upon testing, even where it is not visibly identified during or just after its initial manufacture. In aspects of the present invention with a temporary seal, the channel or groove (or channels or grooves) is located preferably on the end tank or the header, more preferably on the interior surface of the end tank or core's header, even more preferably on the end tank, or, when more than plurality of channels or grooves is present, one or more channels or grooves on both the interior surface of the end tank and the header. Embodiments of the present invention where the heat exchanger comprises at least one radiator and at least one channel or groove on the end tank or the header are particularly preferred.

Likewise, in aspects of the present invention with a defective joint, missing O-rings or similar gasket or other means, can occur at the area of the male and female connection. Particularly in cases where metal to metal contacts take place, that the male and female portions or 'components' that form the fitting can form a 'false seal' or a seal that is not 'complete' or assured to be leak tight or leak proof due to its lack of an appropriate gasket or O-ring, and leading to a defective joint. By defective joint it is meant that the joint forms a seal that is truly temporary, ("a false seal"), and will not survive in intact for its expected life time under usual working conditions. The fluid that flows through the connection, though initially not leaking or being found inappropriately outside of the connection area, may find its way (be detected or leak occur at a later time in its normal life cycle) outside of the connection, due to the fact that no O-ring or gasket or similar sealing means is found between the male and female portions of the connection or 'joint.' Though such a defective joint may pass through conventional screens such as standard leak testing, the joint may not prove durable (may not last its normal lifetime or be 'complete') due to its incorrect assembly and/or formation. Should a false seal condition occur, it has been nearly impossible in the past to detect this type of defective joint in the manufacturing plant, as the connection or connection assembly, and, in the case of a heat exchanger, the heat exchanger connection, will not leak at the area of the false seal when initially tested. Once the heat exchanger or other part is put into service, the defective joint will eventually 'loosen' or otherwise separate one portion from another portion, and, in particular, the female from the male portions, and develop a fluid leak, as opposed to containing the fluid within the interior of the portions at that point.

An aspect of the present invention provides for an assembly, and, for example, a heat exchanger that will be leak proof at male to female fittings or connections, and that will be durable and not abnormally leak in the field. Further aspects of the present invention provide for a method of detecting a defective joint or incorrectly functioning fluid connection, due to false seals at the male to female portion of the fitting or connection, prior to them being shipped outside of the factory or production area. Further aspects of the present invention reduce the defect level in the field by detecting both false seals and potential premature leaks in the manufacturing plant when initially tested as part of the normal leak test process.

In preferred embodiments of the present invention, the channels or grooves on the interior of the end tank or the core's header form a positive leak path which is visible on the interior of the end tank or on the interior or the fluid side, (e.g. coolant, water, air or other fluid side) of the header, and can be easily seen by the naked eye when unassembled. The form or shape of the channels or grooves can be straight, curved, sinusoidal or any other shape that meets the criteria of providing a positive leak path when the sealing means is misaligned or otherwise malpositioned. When a gasket is placed into the 'proper' location, it forms a seal that is leak proof all around the tank to header joint. When the gasket is misaligned or otherwise improperly positioned at the tank to header joint, the fact that the seal is not 'leak tight' or 'leak proof' becomes apparent, (e.g. in underwater dunk, liquid fill, pressure decay, helium mass spectrometer, or other testing) due to the leakage around the defective point of the gasket via the positive leak path.

The channel or groove or channels or grooves of the present invention, preferably, extend from the base of the tank foot to above the level of the gasket in its proper position at the tank to header joint. Preferably, the means of detecting a temporary seal, and more preferably, the channel or groove, extends above the highest point at which an improper seal can be formed between the header and the tank. In geometric terms, the channel or groove or channels or grooves extend up to or above the highest point where a line of tangency still can exist between both the header and gasket and gasket and the end tank.

Aspects of present invention allows a defective joint (and/or potential future premature leak) to be detected immediately, rather than after it is assembled into an end product such as a vehicle, and, preferably a motor vehicle, and used in the field. When the parts or portions are correctly assembled, a complete or correct seal is formed and the overall connection 'joint' will be fully sealed, and the channel or leak path of the present invention, will not positively or negatively affect the joint. A leak will only occur when an assembly comprising a connection, and, in particular, a heat exchanger assembly, has been put together with a missing or otherwise damaged or improperly manufactured O-ring or gasket, such that the sealing means leads to a connection or joint that contains a defect.

In preferred embodiments of the present invention, a leak test material, i.e. a so called 'fluid' of either a gaseous or liquid nature, is used to test the location of the seal means or gasket in the tank to header joint. Examples of such a fluid include water, air, helium, nitrogen, carbon dioxide, etc. The fluid, by bypassing or flowing by the area of the seal at the tank to header joint, enters into the channels or grooves on the interior surface of the end tank and/or header and escapes at the level of contact of the channel or groove with the normally liquid containing interior environment. In general terms, the channel or groove can be characterized as extending from an area open and in contact with the internal liquid containing environment of the tank. in other words, when the sealing means, such as a gasket, is misaligned, the means for detecting a temporary seal, such as a groove or grooves or channels, serve as a type of "leak path" between the inside or interior of the heat exchanger to the outside or exterior of the heat exchanger, allowing fluid to escape. If the sealing means is properly aligned, the grooves or channels remain totally 'covered' or 'blocked' within the heat exchanger, and no fluid escape at the tank to header joint area occurs.

Likewise, in preferred embodiments of these aspects of the present invention, a leak test material, i.e. a so called 'test or testing fluid' of either a gaseous or liquid nature, is used to test the location of the seal means O-ring or gasket in the joint. Examples of such a fluid include water, air, helium, nitrogen, carbon dioxide, etc. The fluid, by bypassing or flowing by the area of the seal, enters into the gap or gaps, channels or grooves and escapes at the level of contact of the gap, channel or groove with the normally exterior environment. In other words, when the sealing means, such as a gasket or O-ring, is missing, the means for detecting a false seal, such as a gap or groove or grooves or channels, serve as a type of "leak path" between the inside or interior of the connection to the outside or exterior of connection, allowing test fluid to escape. If the sealing means is properly aligned, no test fluid flows to escape at the connection or joint area.

Aspects of the present invention further provides for a method of detecting leaks in the tank to header joint comprising the steps of providing a sealing means, e.g. a gasket, on, preferably, the inner surface of the header or the end tank, or on both, and, assembling a header to end tank joint comprising a means for detecting a temporary seal between the header and end tank. The sealing means may be positioned prior to final assembly, in the joint or provided in conjunction with or as part of, one of the pieces making up the header joint (e.g. the tank, tank foot, or header). A preferred method of the present invention is, therefore, a method for detecting temporary seals in heat exchanger assemblies having a core with headers and end tanks at the area of the tank to header joint comprising: providing a sealing means for forming a normally leak proof seal at the tank to header joint between a header and an end tank; passing a test fluid through the heat exchanger core which passes by the area of the normally leak proof seal at the tank to header joint; providing a positive leak path comprising a means for detecting temporary seals such as a channel or groove or the like on the interior surface of the end tank or header in the area of the normally leak proof seal; and examining for evidence of test fluid leakage through the positive leak path indicating a improper, incomplete or temporary seal in the normally leak proof seal area.

Aspects of the present invention further relate to a method of making a positive leak path to determine incomplete or temporary seals, prior to final shipment of quality-verified heat exchanger assemblies. This aspect of the present invention allows the creation of a positive leak path that will be sealed if the sealing means, such as a gasket is properly positioned in the space between the tank and the header, preferably flush with the tank and, in particular, the tank foot. The leak path extends from the tank, preferably at the tank foot at least up to, but preferably above, the point of the tank where the mal-positioned gasket can form a temporary 'leak tight' or 'leak proof' seal.

Other aspects of the present invention have connections, and, preferably, connections with male and female portions and sealing means to create correct or leak proof seals between the male and female portions. By connection it is meant a joint or area where two separate components or assemblies, and, preferably, assemblies comprised of a male or female portion, meet in order to transfer fluid between different areas via the male and female portions of the assemblies. At least one leak path is provided on a mating surface (a surface where direct and continuous contact exist between the male and female fitting) of either the female, the male or both portions. A connection between male and female portions wherein the mating surface or area of the male and female portions is discontinuous between the metal components of the joint in accordance with an aspect of the present invention, provides for a break in the normally continuous mating surface between the metal components of the joint (7), that allows fluid to leak through at least one channel or leak path (9 or 10) if the normally intended sealing means, such as an O-ring or gasket (6), is not present or, in other aspects, is not working correctly due to damage or improper manufacture of the sealing means.

As described above, a false seal can form where male and female inner surfaces of the connection form a continuous or completely touching contact somewhere between the area of normal placement of the O-ring, gasket, or other sealing means, and the outside or external area of the connection. When a sealing means, for example, an O-ring or gasket, is damaged or missing, close contact between two machined or form fitted parts, an unintended seal that can allow for leak testing fluid to be contained, leading to an apparent 'leak tight' or defect joint may remain, until actual use of the assembly in its intended use shows the presence of the defective, or non-leak light joint.

The present invention, in all its embodiments, results, thereby, in markedly better detection of 'non-conforming' or future 'leaking' heat exchanger assemblies, especially heat exchanger assemblies having a core comprising a header and tanks attached to the core at the header in a way to form a tank to header leak proof seal, that reduces or eliminates the occurrence of 'non-conforming' or future 'leaking' assemblies reaching the customer in less than optimal condition for performance, by detecting leaks at the initial assembly manufacture stage.

As used in the present specification, a permanent seal is, therefore, a seal which is designed to withstand pressure, temperature, chemicals and/or other conditions encountered during the expected, normal 'lifetime' of the product, e.g. the life of a heat exchanger. A 'temporary' seal is, therefore, a seal usually inadvertently produced that would not be designed for and/or expected to last the lifetime of the product. Aspects of the present invention solve the problem of detecting temporary seals, and, in particular, undesirable seals formed by sealing means, such as gaskets, and, in particular, rubber or plastic, or rubber-like or plastic-like gaskets, which may lead to false positive results and resultant failures of assemblies due to non detection of potential future leakages. Other aspects of the present invention solve the problem of detecting false seals, and, in particular, defective joints amongst connections. Therefore, a positive leak would indicate the presence of an incorrect or improperly located or a missing gasket that does not adequately seal or 'falsely' seals at the tank to header joint area or the male to female connection area respectively.

Aspects of the present invention provide distinct advantages for tank to header joints employing seals. For heat exchangers, defective or 'temporarily sealed' assemblies, that might normally pass ordinary leak tests used in the industry, can be detected and contained within the manufacturing plant, reducing or eliminating customer returns.

In preferred embodiments of the present invention, the section of the end tank or side in contact with the header is of greater width or breadth than the side at other areas of the header. This section of the end tank is often called a 'foot' or 'tank foot', and this term is common in the field of heat exchangers. Since the tank foot serves as a base or supporting section at the tank to header joint area, the tank foot, due to its shape and increased mass, allows the header to be bent on or 'crimped' on or to the end tank, in order to provide an intimate connection and, maintain a leak tight or leak proof seal necessary to prevent fluid escape from the interior of the tank.

In other preferred aspects of the present invention, the male and female portion mating surfaces have an area or areas of contact between the male portion and female portion, and the female portion and sealing means and male portion and sealing means (e.g. gasket or O-ring), in relation such that when the gasket or O-ring is appropriately present and not improperly manufactured or damaged, no inadvertent or inappropriate leaks occur. The area or areas of contact, or mating surfaces, are preferably continuous around or about, the perimeter of the male and female portions in the area of contact. The present invention, therefore, by breaking the continuous mating surface between the metal components of the joint (7), and, particularly the connection male and female portion allows fluid, and, particularly test fluid to leak through the leak path (9 or 10) if the design intent seal (6) is not present or is not working correctly.

The aspects of the present invention that provide for a connection with a leak path from the area of normal presence of the sealing means (O-ring or gasket) to an area outside or external to the connection, where detection, preferably, by traditional leak testing involving pressure testing, or visual examination, or other means consistent with detection of leaks, can be done prior to releasing the connection, assembly or end product, prior to sale or removal from its site of production. The type of connection can be any type of male and female type connection, i.e. connection with female and male portions. This connection can preferably be part of a heat exchanger assembly. Connections can be held together in many ways such as, preferably, threading or snap fitting. More preferably, the type of connection is a threaded connection. These aspect of the present invention, by providing for a means such as a leak path to the area where a sealing means is normally present in such connections, allows for detection of problems with the presence (or lack thereof) of the 'correct' leak tight or leak proof connections and defectives joints, so that potential future leaks are detected prior to leaving the production floor. These aspects of the present invention, therefore, can be used in any design whereby the male and female portions provide for an unintended or false seal at an area that may leak prior to the end of the intended or specified product life cycle.

In preferred embodiments of this aspect of the present invention, a leak path is created between two machined or form fitted parts. The discontinuous mating surfaces form a gap, or other discontinuity such as a channel or groove, or other such structure. The form or shape of the gap, the channel or the groove can be straight, curved, sinusoidal or any other shape that meets the criteria of providing a leak path when the O-ring or gasket sealing means is missing or damaged. When a gasket or O-ring is placed into the 'proper' location, it forms a seal that is complete or leak proof. When the gasket or O-ring is missing or damaged, the fact that the seal is not 'leak tight' or 'leak proof' becomes apparent, using normal leak testing methods (e.g. in underwater dunk, liquid fill, pressure decay, helium mass spectrometer, or other testing) due to the leakage around the 'defective' point of the gasket or O-ring via the leak path.

Therefore, the present invention provides for, in its various embodiments, a heat exchanger assembly, with tank to header joints with seals, the seals normally produced to be permanent seals, having a core with a header; an end tank; a joint between the header and the end tank; a sealing means between the header and the end tank at the tank to header joint; and a means for detecting a temporary seal between the header and the end tank. The means for detecting a temporary seal, therefore, can form a positive leak path between the header and the end tank. In preferred embodiments, the means for detecting a temporary seal is a channel or groove on the header or the end tank. Also preferred is where the means for detecting a temporary seal is located on the interior surface of the header or end tank. The means for detecting a temporary seal may also be located on the header and the end tank.

Preferred sealing means may be made out of any material with appropriate elastomeric properties. In preferred embodiments, for example, the sealing means is made of a rubber or rubber-like material or of plastic or a plastic like material Even more preferred is when the sealing means is a gasket. Since the sealing means, if improperly positioned or forming a temporary seal, shows a positive leak path in the present invention, in preferred embodiments with tank feet attached to headers, the means for detecting a temporary seal preferably extends from the tank foot to the internal liquid containing environment of the tank in the area of the temporary seal.

BRIEF DESCRIPTION OF THE DRAWINGS

FIGS. 11*a*, 11*b* and 11*c* are schematic representations of the interior and exterior part of an end tank, and multiple configurations of means to detect temporary leaks, such as grooves or channels, forming positive leak paths, in accordance with an aspect of the present invention.

FIGS. 20*a*, 20*b* and 20*c* show perspective views of a connection having a gap in female portion in accordance with an aspect of the present invention.

DESCRIPTION OF THE PREFERRED EMBODIMENTS

As described above and herein below, the means for detecting an inappropriate, incomplete or temporary seal, in accordance with an aspect of the present invention, may consist of modifications, deformations, perforations, cut-outs, scratches or the like, that serve as 'channels' or 'grooves' in the header or end tanks, preferably in the end tank, or in the end tank and header. Therefore, the actual shape or orientation of the means can vary accordingly to how and where it is positioned or the header or end tank. The means for detecting temporary seals (detecting future potential leaks) provides for a positive leak path in the case that the sealing means or gasket is misaligned or improperly positioned in the tank to header joint.

In a preferred embodiment of the present invention, a positive leak path is formed by a channel or groove located on an end tank. Preferred is where a plurality of channels or grooves is located on the end tanks. Also preferred is where a positive leak path is formed by a channel or groove located on a portion of a header. Also preferred is a channel or groove on both the header and end tank. More preferred is where a plurality of channels or grooves is located around the inner perimeter of the end tank. Also more preferred is where a plurality of channels or grooves is located on the header. The plurality of channels or grooves must be found at the area of the tank to header joint. Even more preferred is where the plurality of channels or grooves on the header or the end tank is at the majority of locations possible, or, more preferably, at every location where concern about the leak tight nature of the end tank to header joint is suspected or warranted.

In preferred embodiments of the present invention, a seal is formed at the end tank to header joint. The material to form a seal is preferably made of an elastomeric substance, such as rubber or rubber like substance or material or a plastic like substance or material, or any other substance or material where the characteristics necessary for manufacture and functionability, such as elasticity and resilience, as well as thermal and pressure and chemical resistance, are present. Also, preferred materials have characteristics to withstand conditions of temperature, pressure, chemical and other conditions, for the normal lifetime of the heat exchanger. A common form of seal with such properties is a gasket. Preferred embodiments of the present invention, therefore have sealing means comprising a gasket, (or other form, material) which, when placed in the tank to header joint, particular at the tank foot of the tank to header joint, forms a leak proof seal. More preferred for vehicle heat exchanger use is a gasket.

Figure 1A:
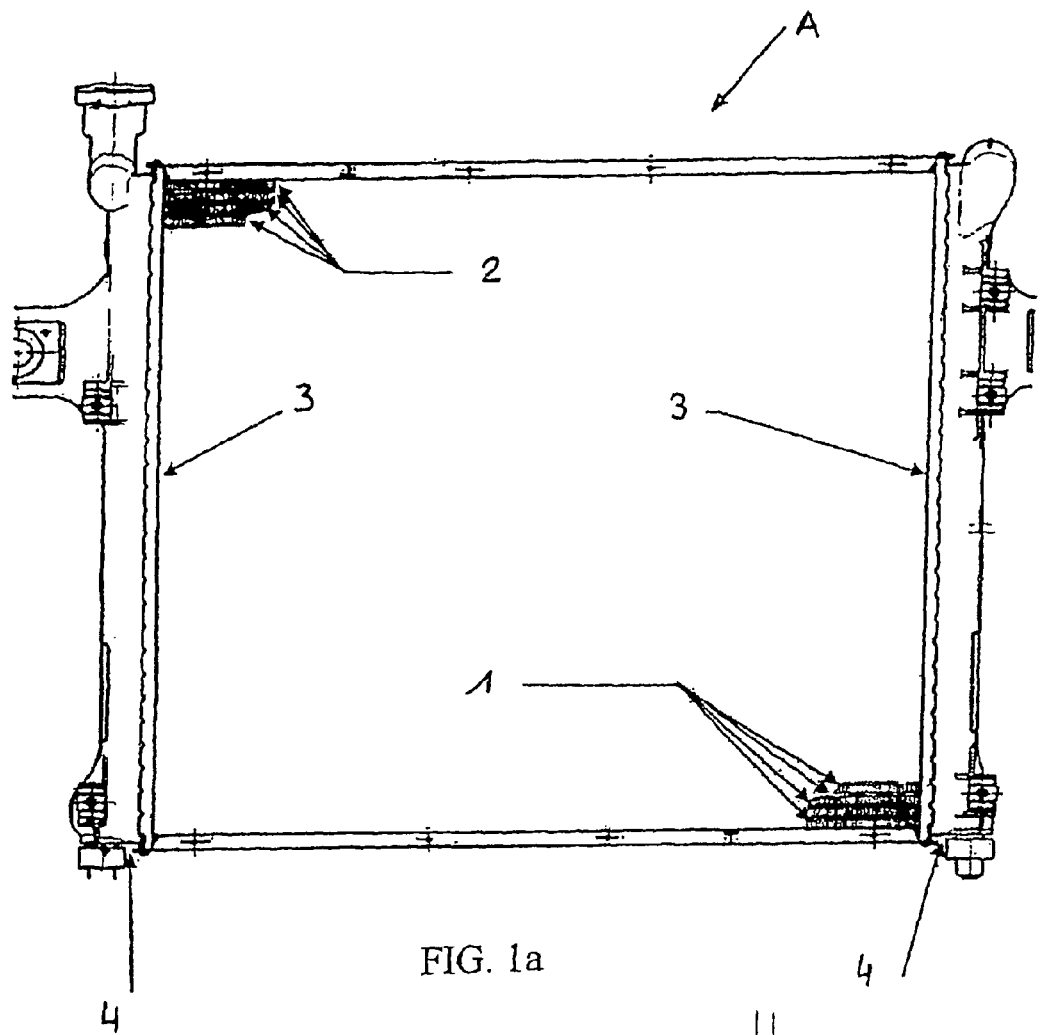
FIG. 1 is a schematic representation of a heat exchanger comprising a core including headers and end tanks as found in the prior art.
Figure 1B:
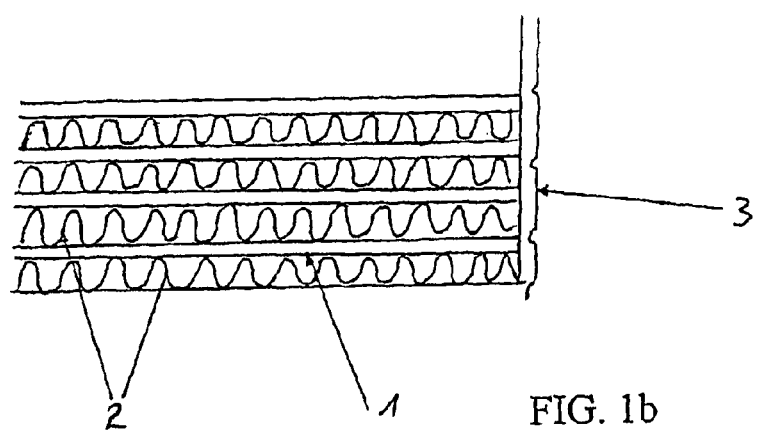
Figure 2:
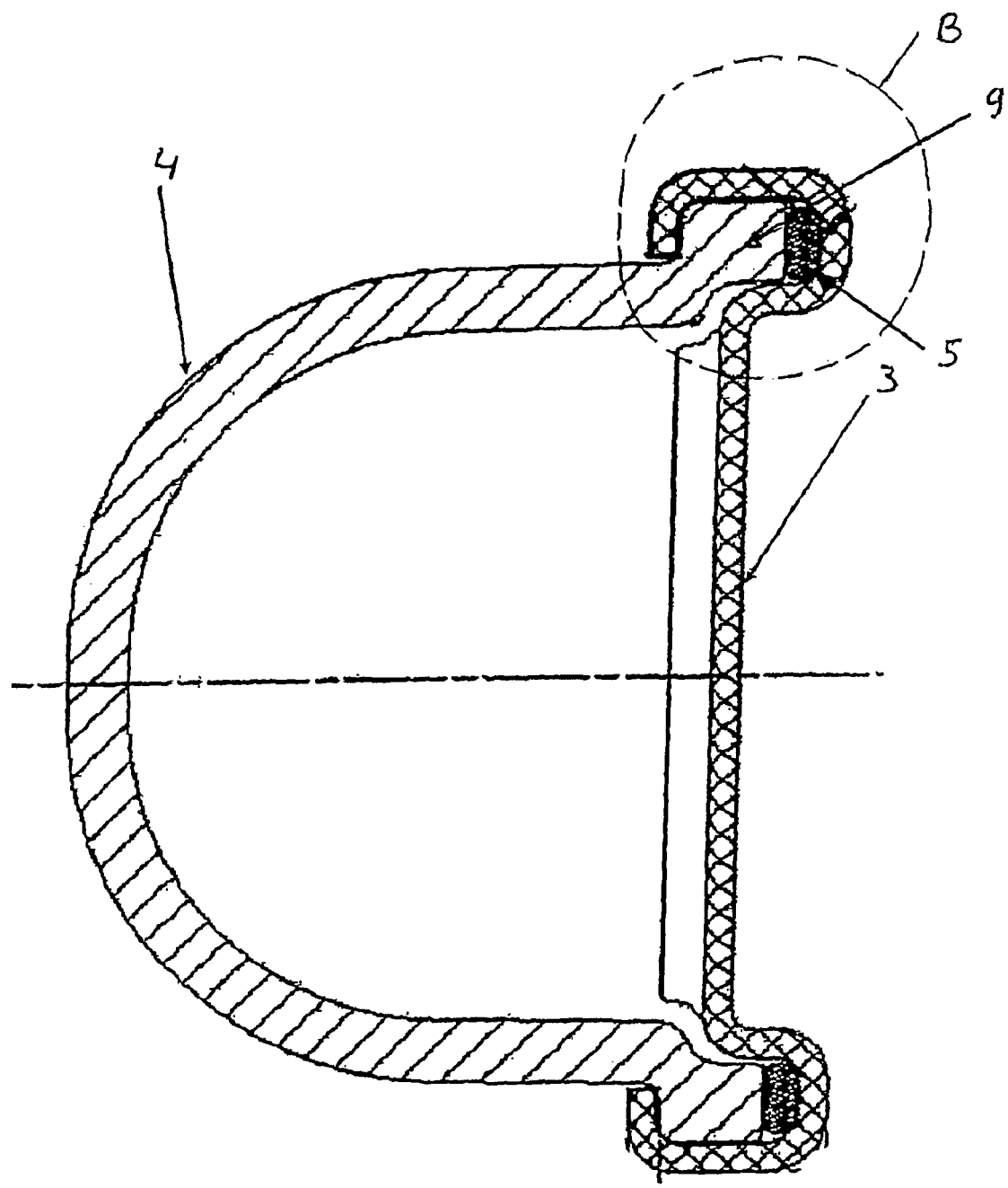
FIG. 2 is a schematic representation of cross-section of the header, tank and gasket of a heat exchanger as found in the prior art.
Figure 3:
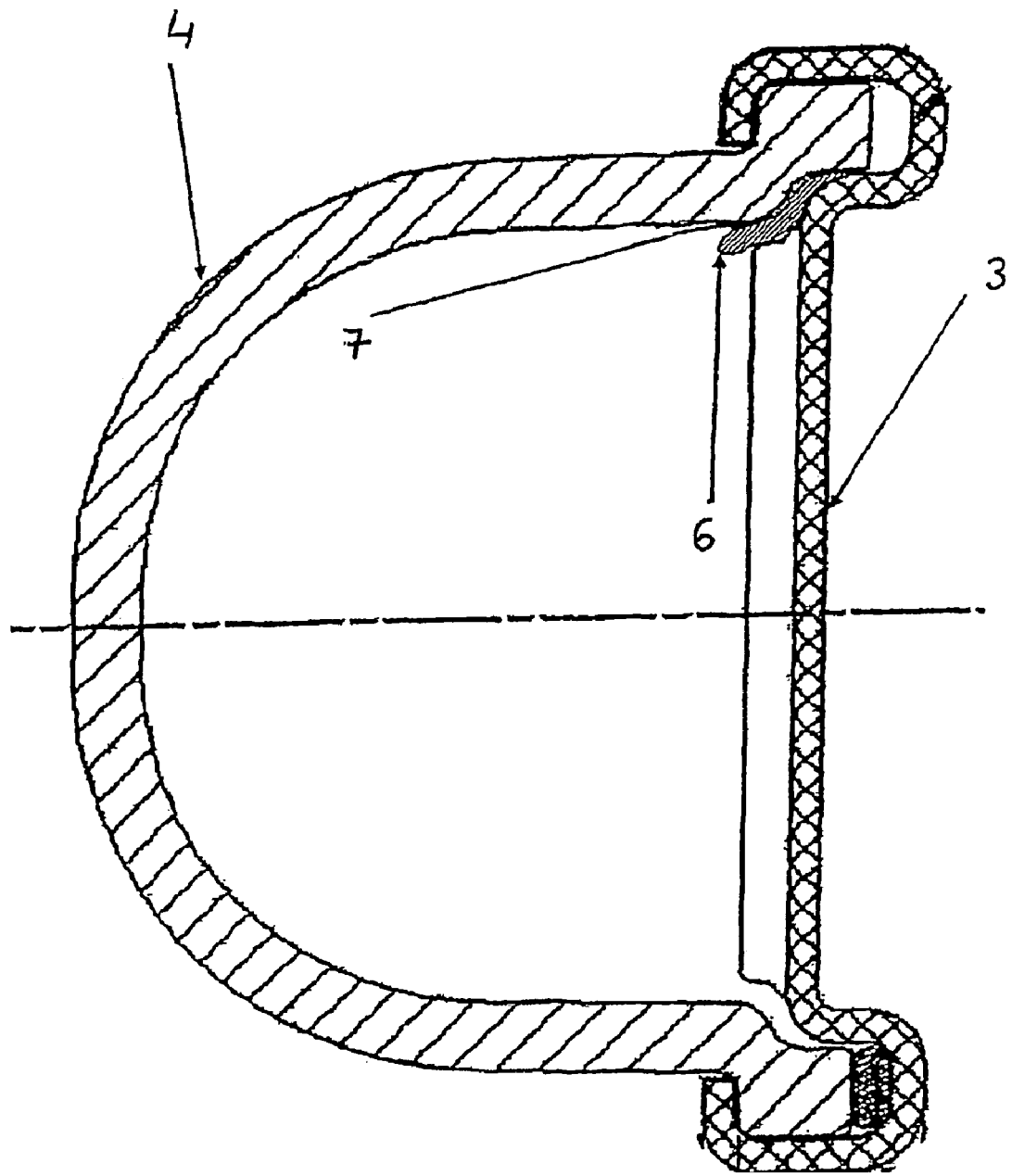
FIG. 3 is a schematic representation of cross-section of header, tank and gasket of a heat exchanger wherein the gasket is misaligned or malpositioned, but wherein a temporary seal is formed, as found in the problems of the prior art.
Figure 6A:
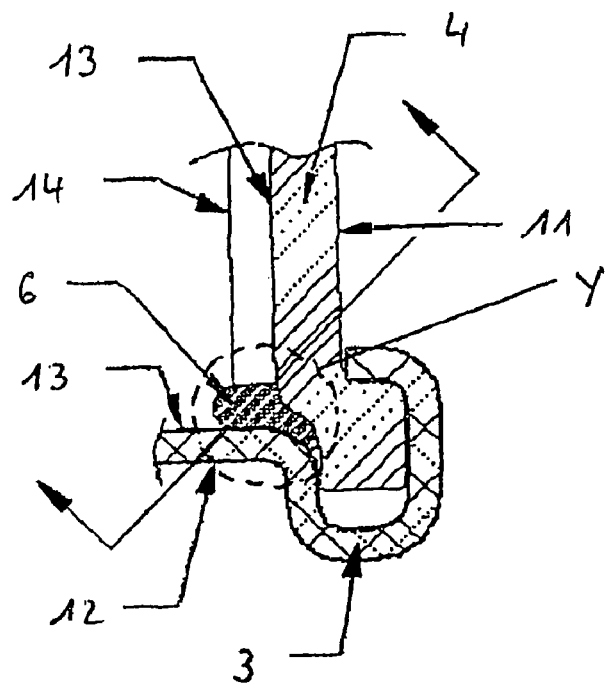
FIGS. 6a and 6b are two schematic cross-sectional representations of a tank with tank foot, and header, wherein a temporary seal is present due to misalignment of the gasket, as found in the problems of the prior art.
Figure 6B:
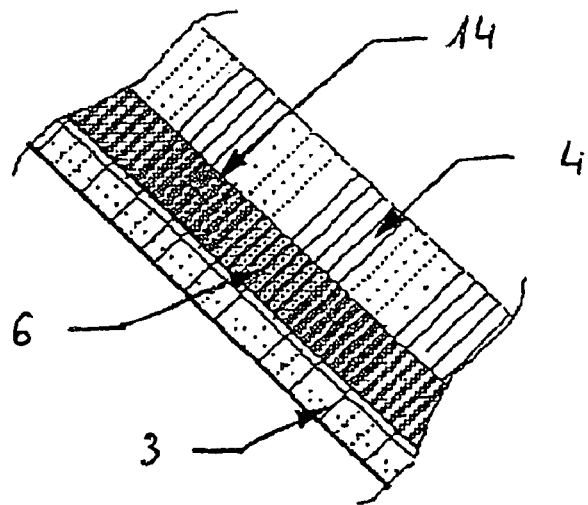

Referring to FIGS. 1-3 and 6*a* and 6*b*, a heat exchanger A is shown, having fins or separators (2), headers 3, and end tanks (4). The core consists of tubes (1) and separators (2). FIG. 2 shows a cross section of a tank and header joint B, comprising the end tank (4), gasket (5) and header 3, the gasket positioned between the end tank (4) and the header (3) at the tank foot (9). FIG. 3 further shows the area of a temporary seal (7) and misaligned or mal-positioned gasket 6 as common in the prior art. FIGS. 6*a* and 6*b* show a misplaced gasket (misaligned) gasket (6), with the solution of an internal rib (14) to prevent movement from outside area Y in case of misalignment (as known in the prior art). The position of gasket (6) between the rib (14) and the inner surface (13) of the header (3), still allows for damage to the gasket with potential premature leakage at the joint during the normal lifetime of the heat exchanger tank assembly.

Figure 4:
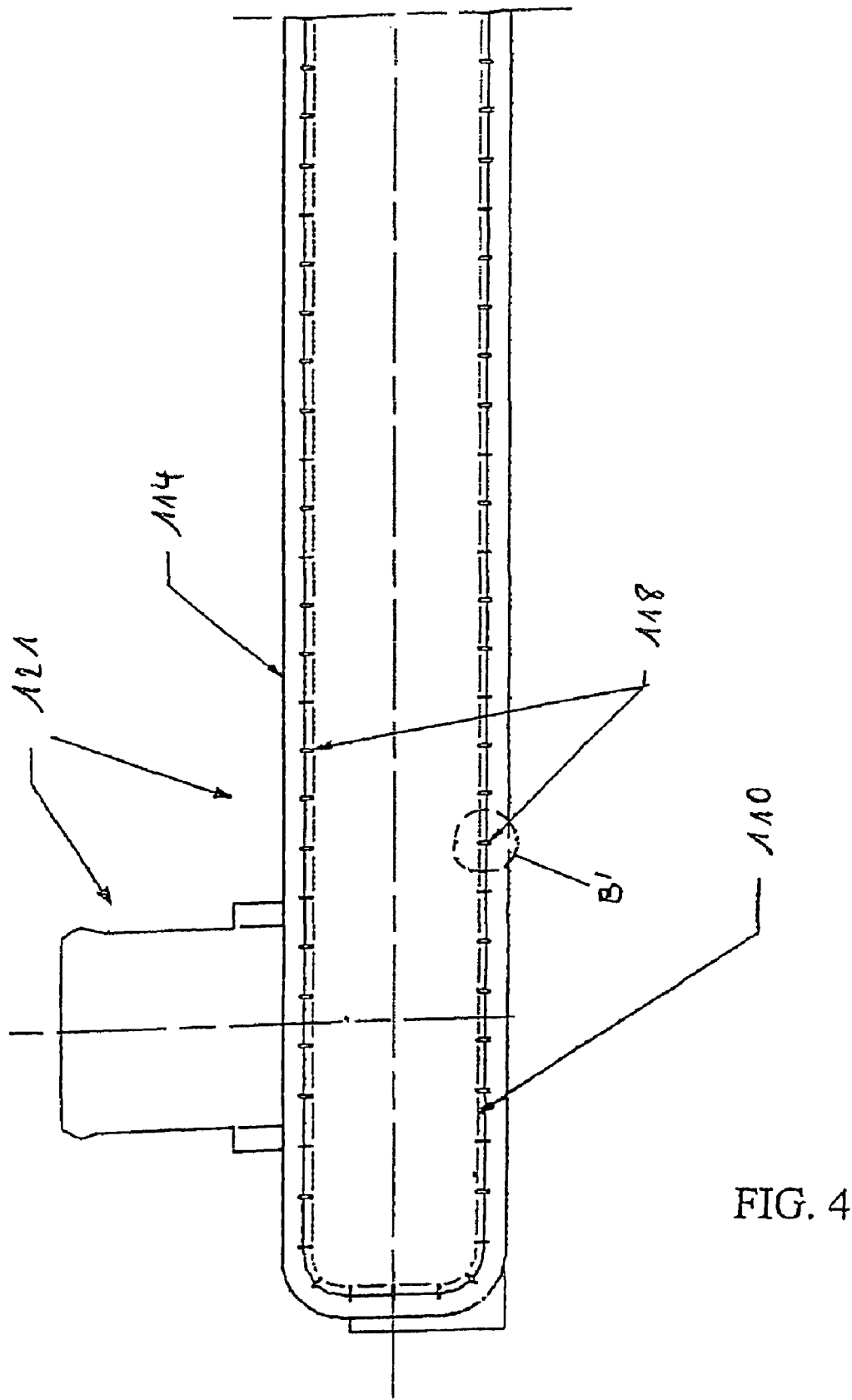
FIG. 4 is a schematic representation of an end tank comprising channels or grooves located at the areas of end tank to header joints in accordance with an aspect of the present invention.
Figure 5:
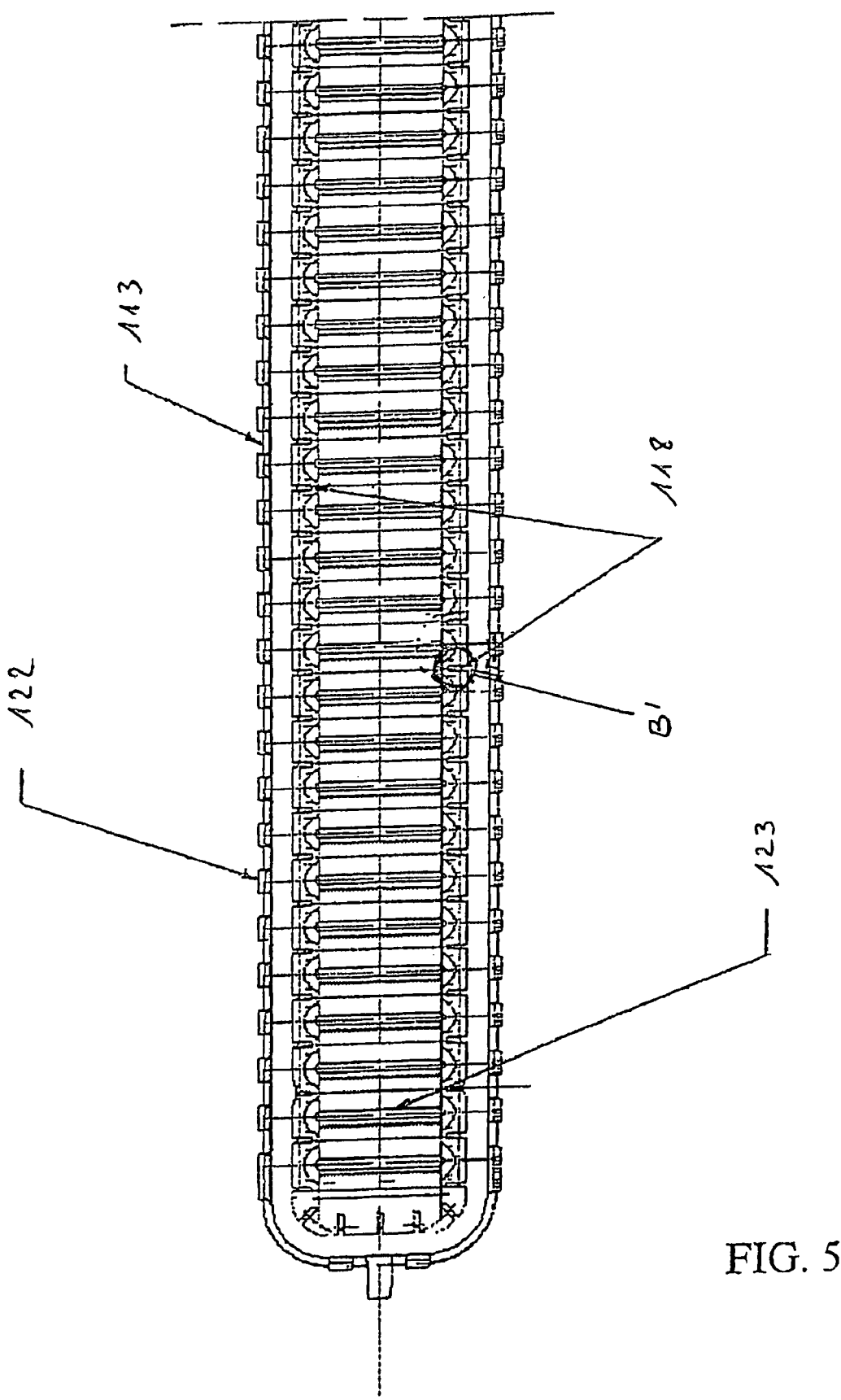
FIG. 5 is a more detailed schematic of a header comprising channels or grooves located at the areas of end tank to header joints in accordance with an aspect of the present invention.

In FIG. 4, an end tank (114) of the heat exchanger assembly as shown, with the interior surface (110) and exterior surface (121) of the end tank (114) illustrated. At the tank to header joint area B', a means for detecting temporary joints, e.g. a groove or channel (118) is provided, providing for a positive leak path. FIG. 5 further shows the exterior surface (122) of the header (113), and the interior header surface (123). The grooves or channels (118) form positive leak paths to detect temporary seals in the tank to header joint area B'.

Figure 7A:
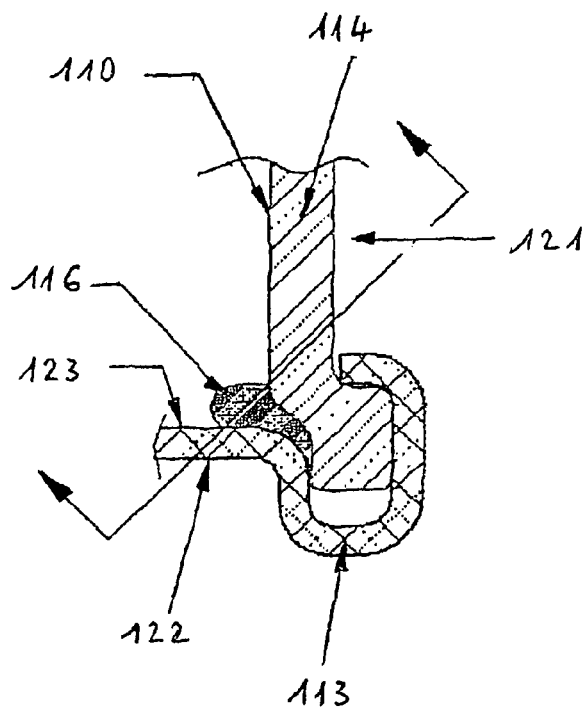
FIGS. 7a and 7b are schematic cross-sectional representations of a tank with tank foot, wherein the cross sectional 'cut' is in between two positive leak paths, in accordance with an aspect of the present invention.
Figure 7B:
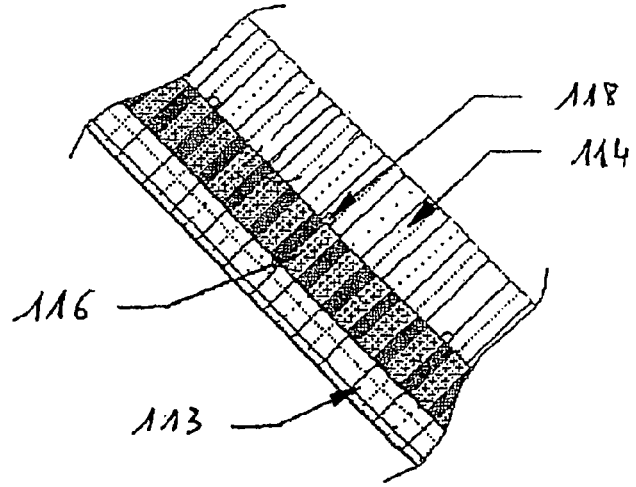

FIG. 7*a* and *b* show both a cross-section and cut-away view of the tank to header joint area where the present invention solves the temporary seal detection problem. The inside surface (110) of the tank (114), is shown, with gasket (116) improperly placed between the header foot 114 and the inner surface (123) of the header (113). FIG. 7*b* shows the gasket and the groove or channel (118), on the inner surface (110) of the tank (114).

Figure 8A:
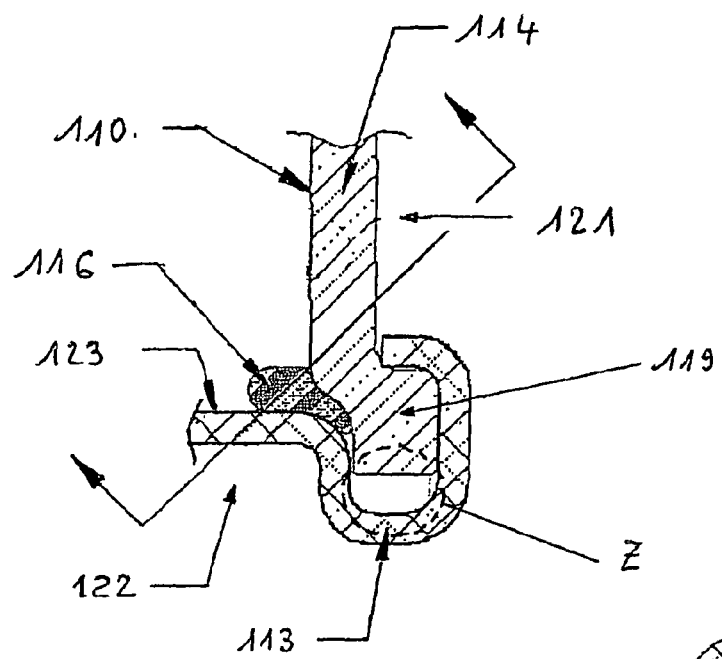
FIGS. 8*a* and 8*b* are schematic cross-sectional representations of a tank with tank foot, channels or grooves in both the header and in the end tank, in accordance with an aspect of the present invention.
Figure 8B:
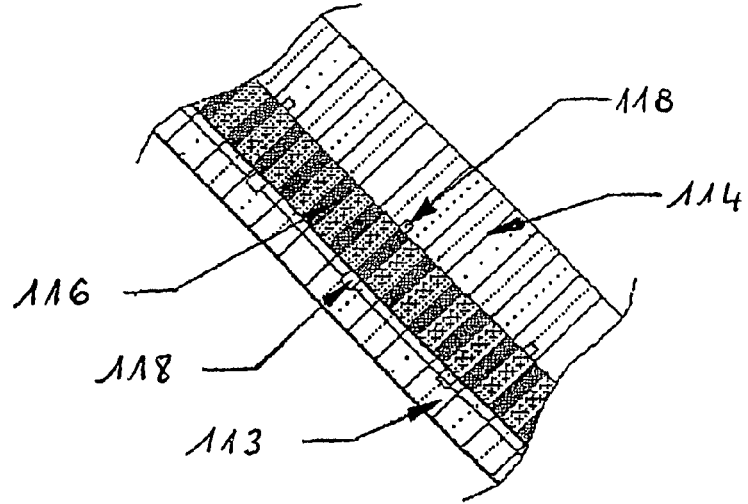

FIGS. 8*a* and 8*b* show the tank (114), with tank foot (119), the exterior surface (121) of the end tank (114) and the interior surface (110 of the tank. Gasket (116) is positioned away from its normal properly positioned location Z. Grooves or channels (118), are located on end tank (114) and the header (113), to detect the misaligned or misplaced sealing means.

Figure 9A:
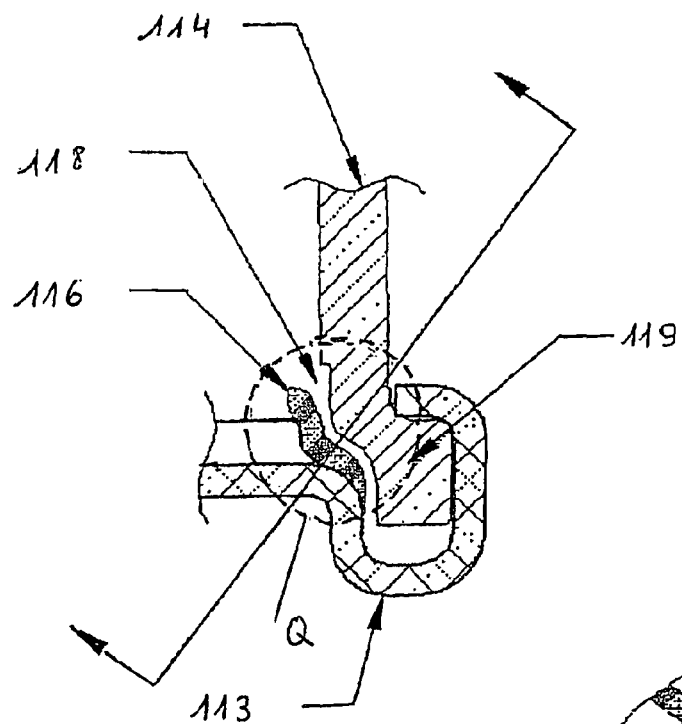
FIGS. 9*a* and 9*b* are schematic cross sectional representations wherein is depicted a header, tank and gasket of a heat exchanger (wherein the gasket is misaligned or mal-positioned, but wherein a temporary seal may be formed) through one of the positive leak paths, in accordance with an aspect of the present invention.
Figure 9B:
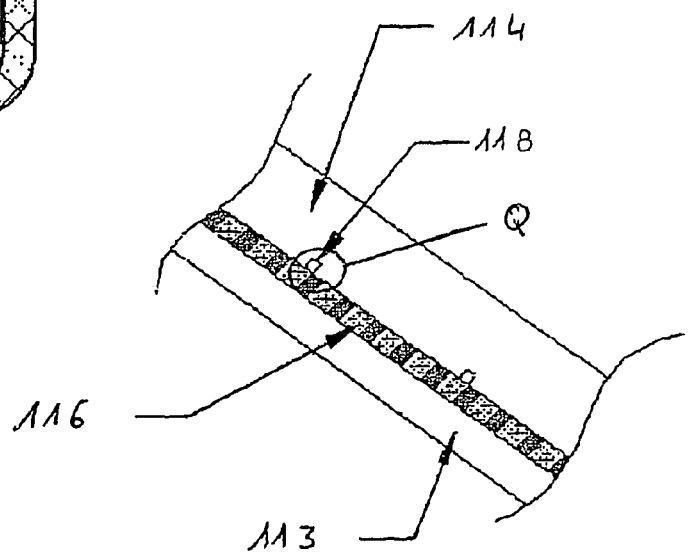

FIGS. 9a and 9b are shown with an end tank (114), with tank foot (119), having a misaligned gasket (116) between the header (113) and the foot (119). The grooves or channels (118) form a positive leak path to show failures, i.e. inappropriate, inadequate or incorrect seals (temporary seals) at the tank to header joint area Q.

Figure 10A:
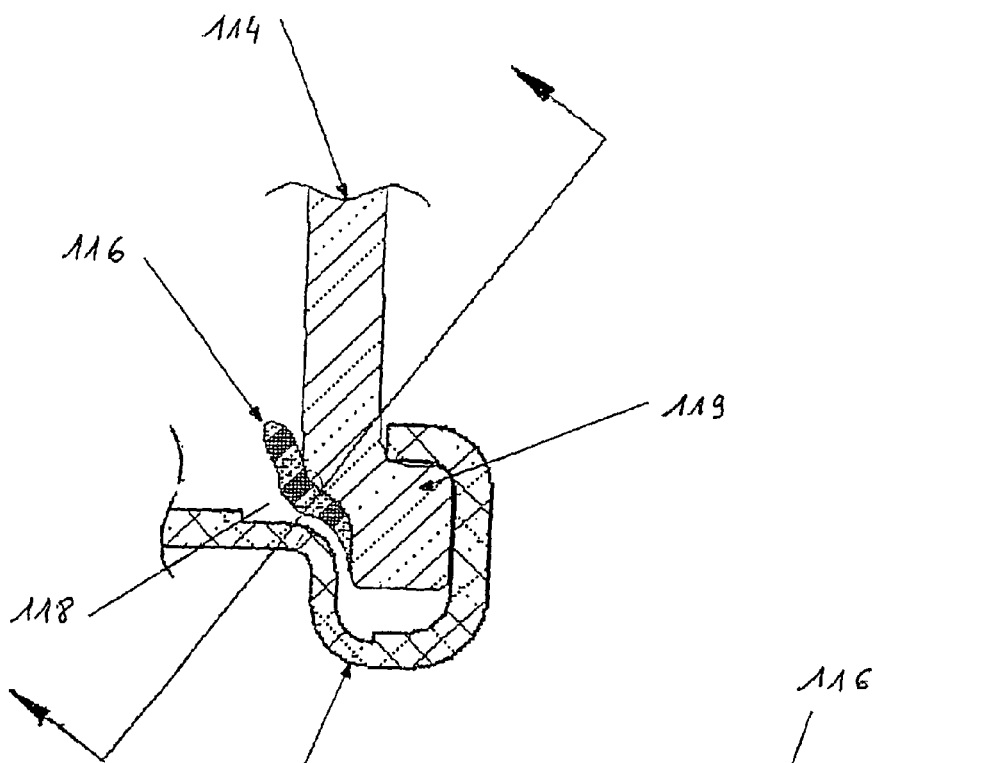
FIGS. 10*a* and 10*b* are schematic representations of cross-section of header, tank and gasket of a heat exchanger wherein the gasket is misaligned or mal-positioned, wherein when a temporary seal is formed, the cross sectional cut thorough one of the positive leak paths, in accordance with an aspect of the present invention.
Figure 10B:
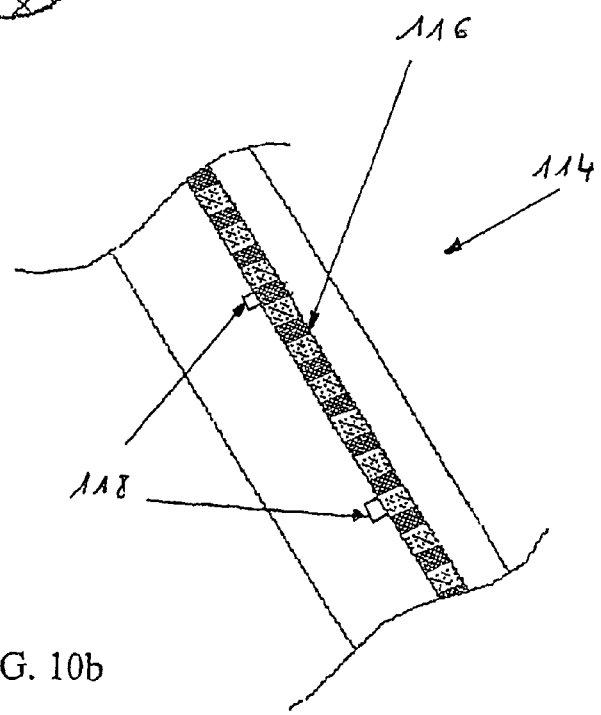

FIGS. 10a and 10b show another version of end tank (114), header (113), and misaligned gasket (116), wherein a means for detecting temporary seals, such as a groove or channel (118), is provided.

FIGS. 11a, b and c show multiple designs for means for detecting temporary seals, such as grooves and channels (118) of various shapes, such as straight, curved, sinusoidal, etc, end tank (114) or tank foot (119), or header and end tank, where the end tank or header grooves have designs that all provide for detection of inadequate, incorrect or inappropriate seals that diminish the normal lifetime of the heat exchanger assembly at the header to end foot joint area.

Figure 12:
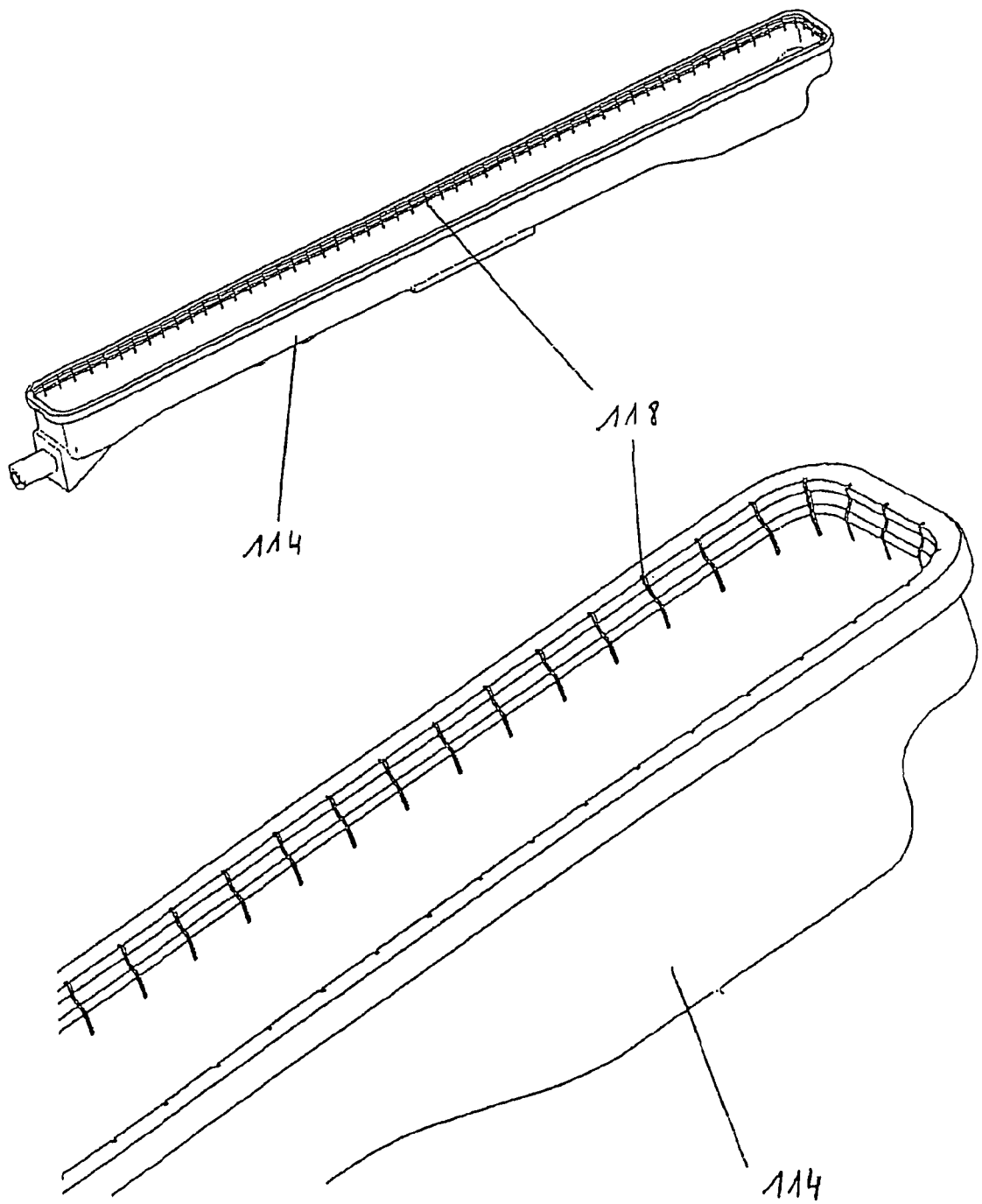
FIG. 12 is a perspective view of a heat exchanger end tank, with grooves on the tank, in accordance with an aspect of the present invention.

FIG. 12 shows an end tank (114), with grooves or channel (118) at the tank to header joint area.

It is therefore recognized that the present invention further relates to a method of making a positive leak path to determine incomplete or temporary seals, prior to final shipment of quality-verified heat exchanger assemblies. This aspect of the present invention allows the creation of a leak path that will not be accessible if the sealing means, such as a gasket is properly present or undamaged.

Figure 13:
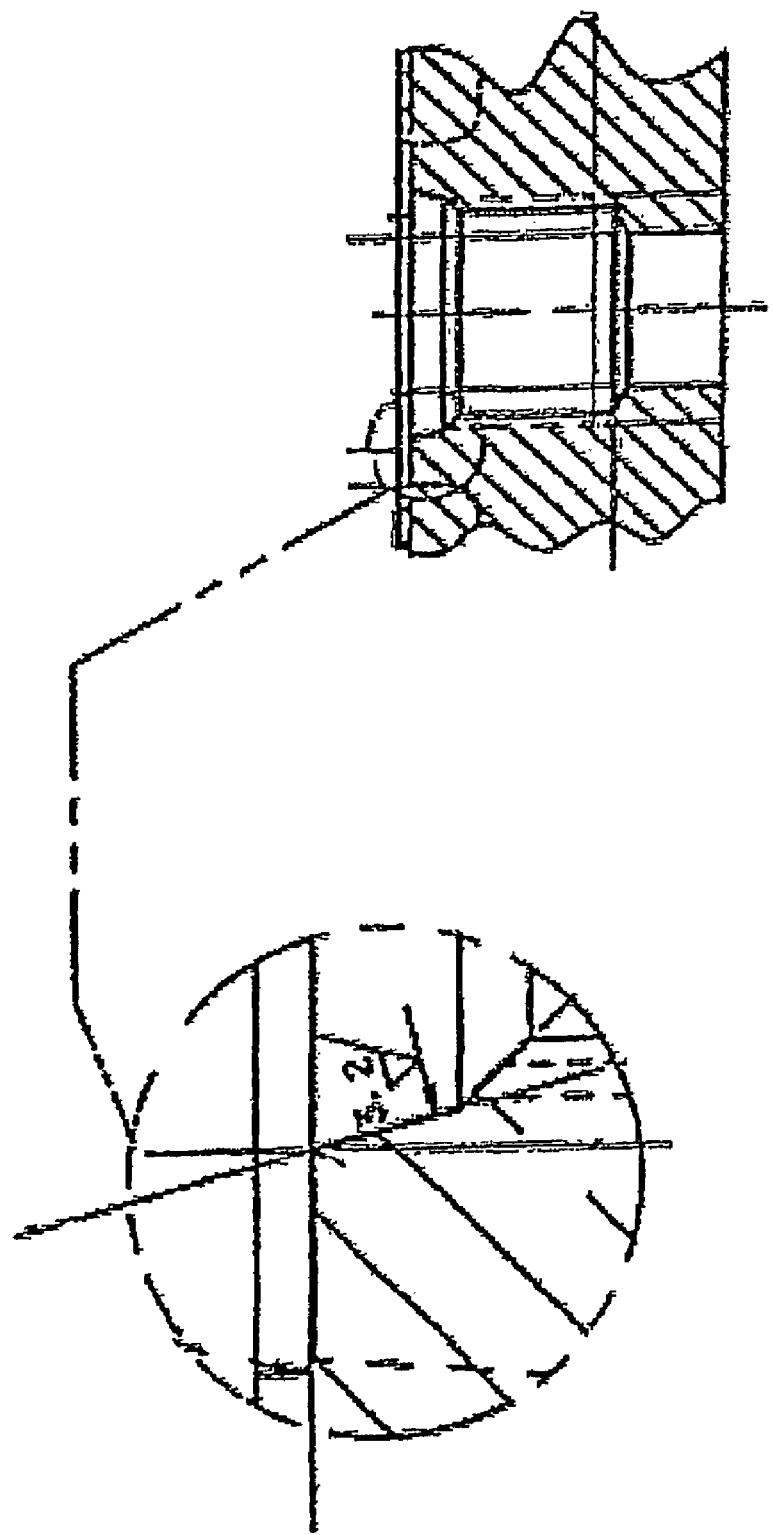
FIG. 13 shows a SAE J1926-1 standard for threaded connection (female portion).
Figure 14:
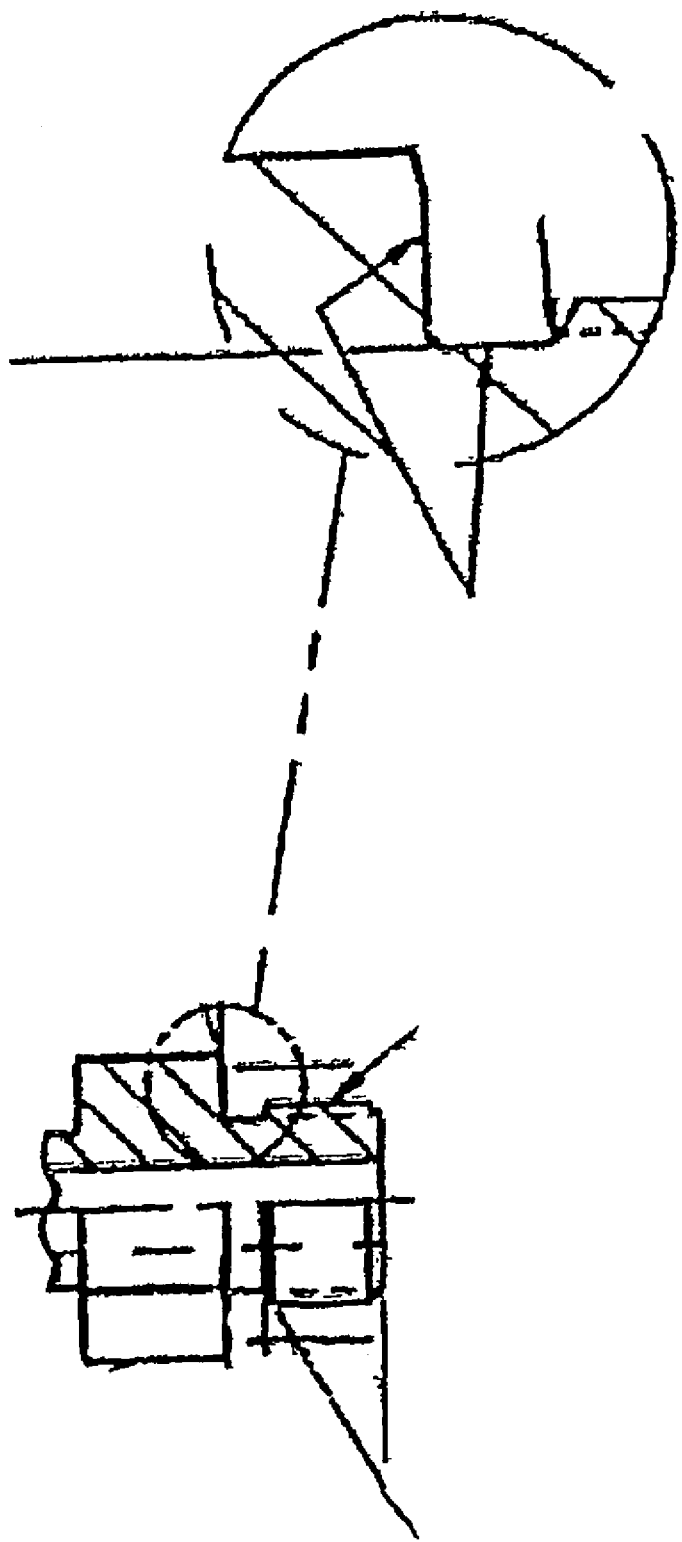
FIG. 14 SAE J1926-2 standard for threaded connection (male portion).

Referring to FIGS. 13 and 14, SAE J1926-1 standard for threaded connection female portion and SAE J1926-2 standard for threaded connection (male portion are shown.

Figure 15:
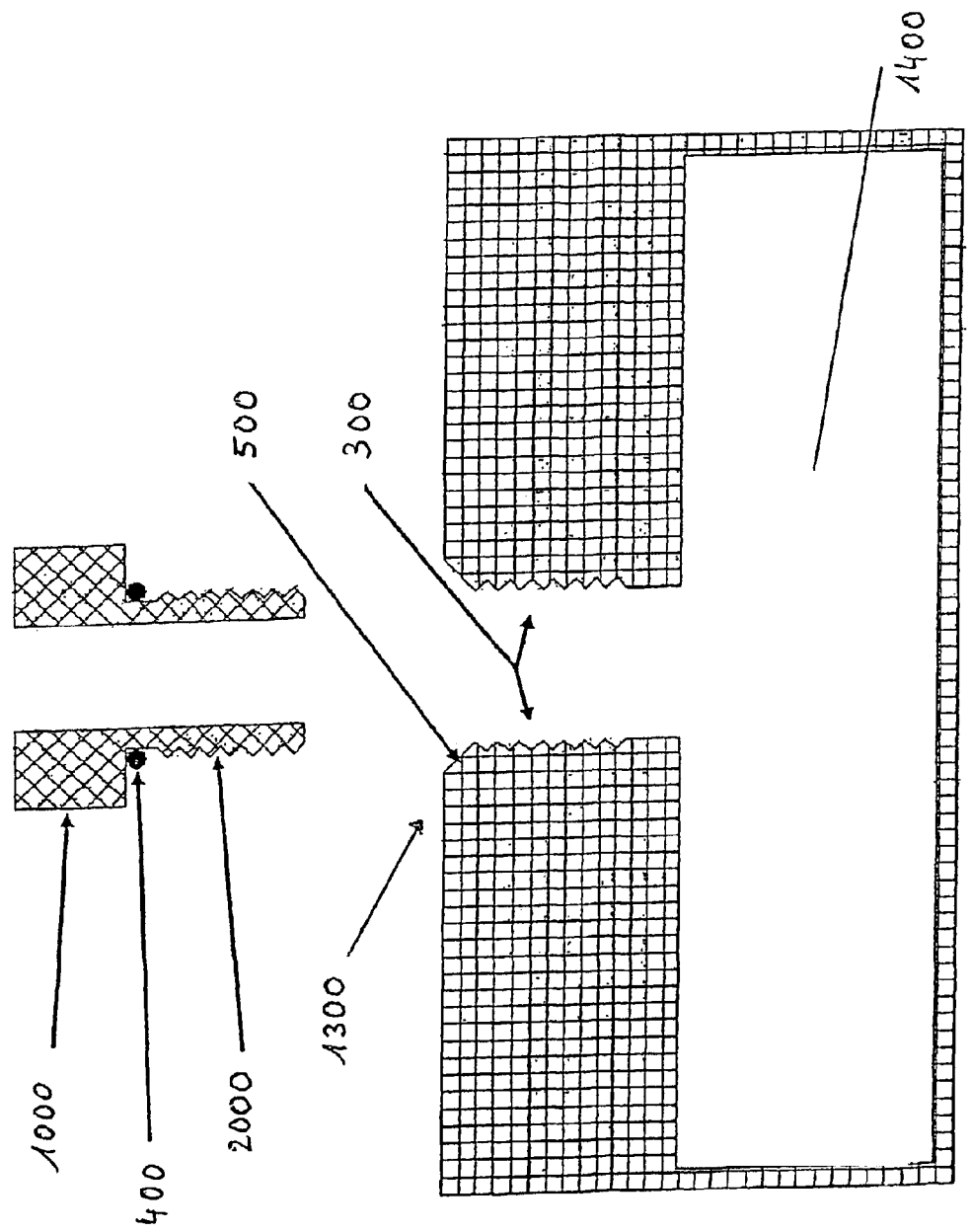
FIG. 15 shows a schematic view of a section of male and female portions of a fluid fitting connection in accordance with known standards.

FIG. 15 shows and exploded view of a male-female fluid fitting connection portions (1000, 1300) with female threads (300), male fitting (1000) and O-ring (400) placed in proper area for normally complete seal, with O-ring mating surface (500) on the female portion, and male threads (2000) further illustrated. The interior of the part on which the fluid connection is to be assembled (1400), is also shown, and conforms with known standards.

Figure 16:
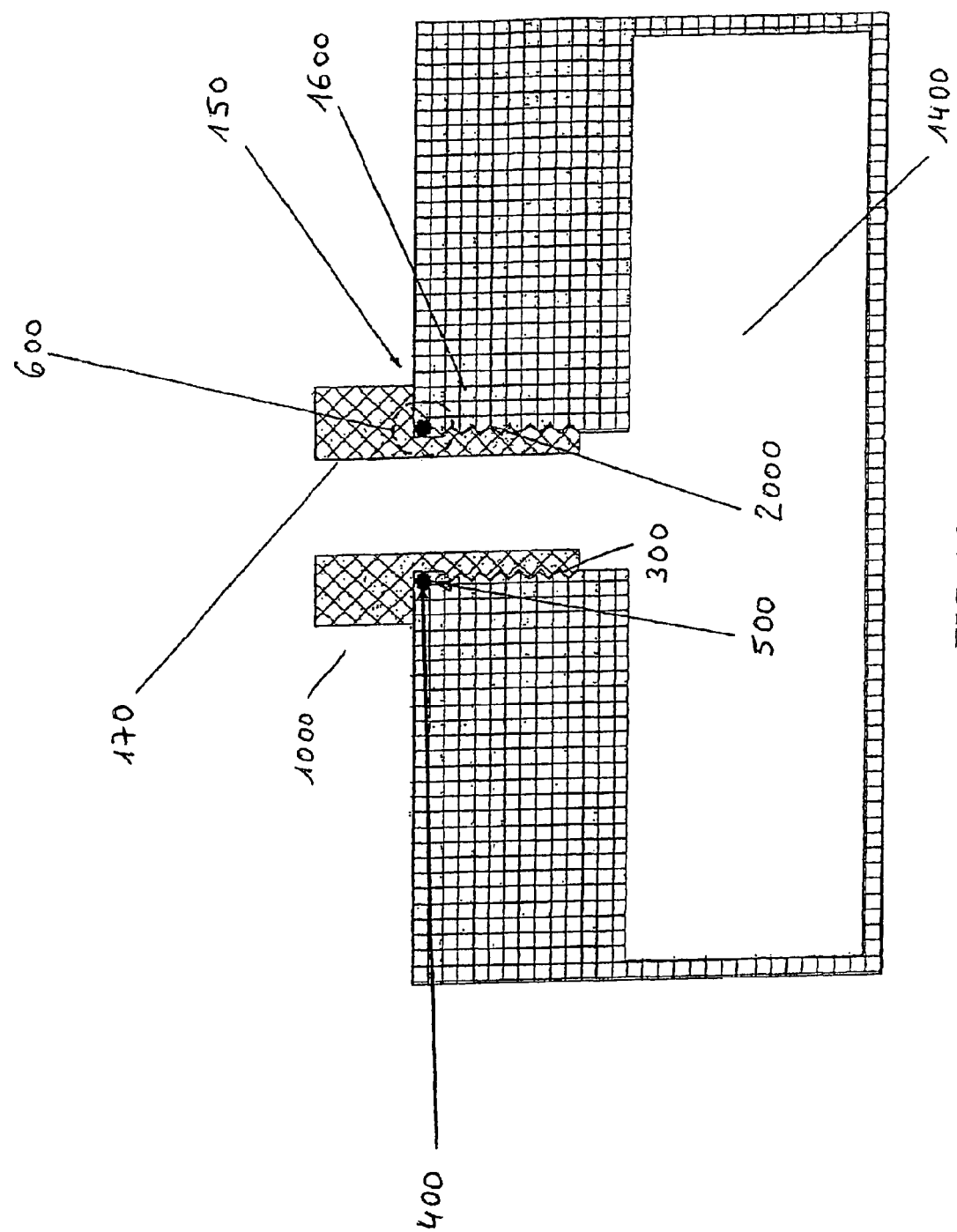
FIG. 16 shows a schematic view of a section of connection in FIG. 3, in assembled form, in accordance with known standards.

FIG. 16 similarly shows the view as assembled of the male-female fluid fitting connection joint (150) with female threads (300) male fitting (1000) and O-ring (400) placed in proper area, with O-ring seal (600) at the female and male portion (1600, 1700), and male threads (2000) further illustrated. The assembly as shown, demonstrates a complete or correct (leak tight or leak proof) seal (600) which conforms with known standards.

Figure 17:
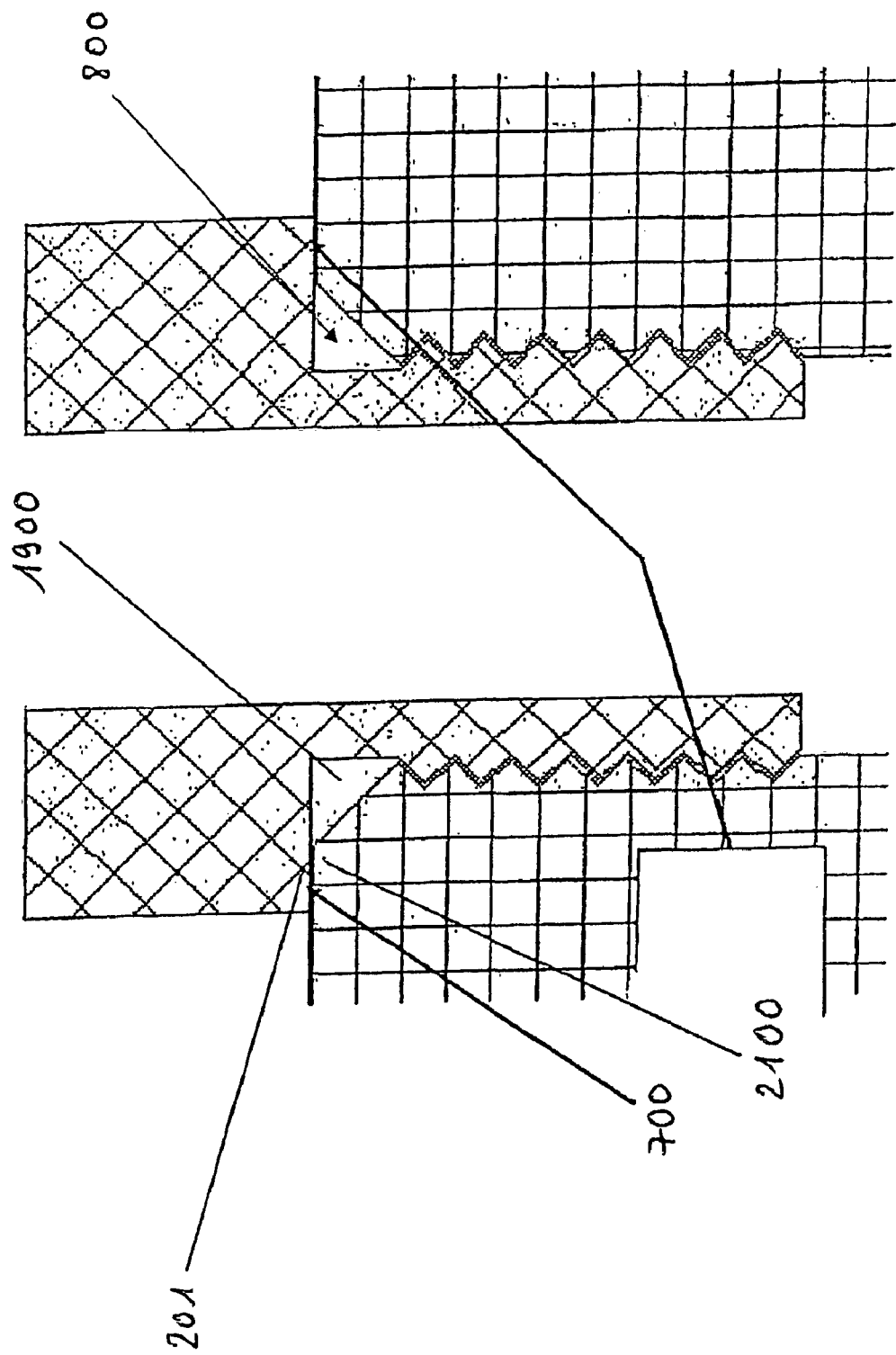
FIG. 17 shows a schematic section of a connection with unintended or false sealing surfaces shown, due to missing O-ring.
Figure 18:
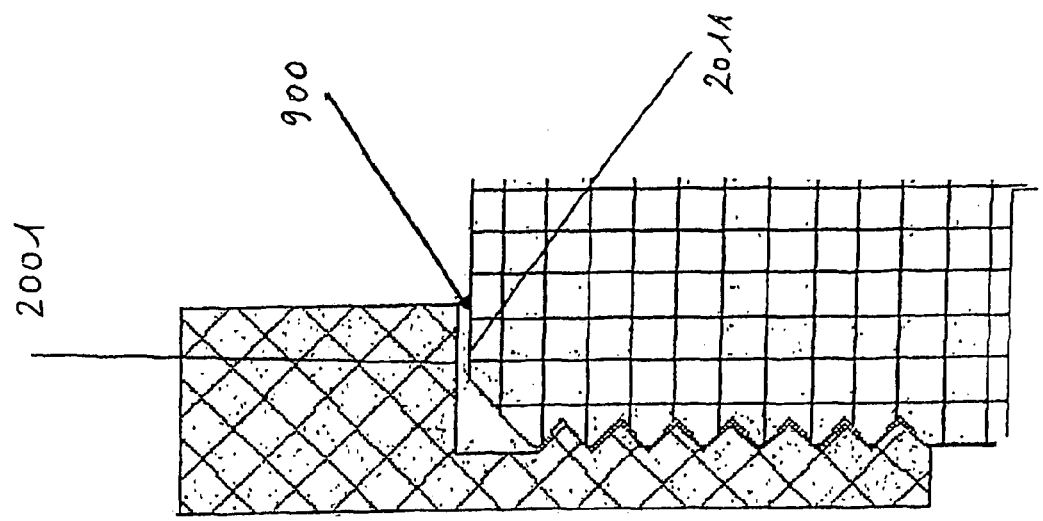
FIG. 18 shows a schematic section of a connection having a gap in female portion in accordance with an aspect of the present invention.
Figure 18:
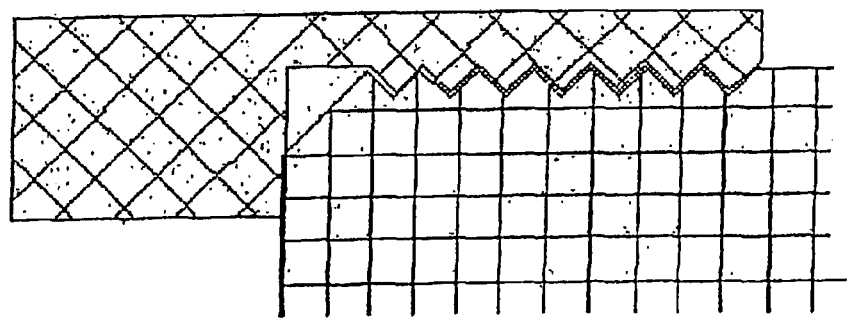
Figures 19A, 19B:
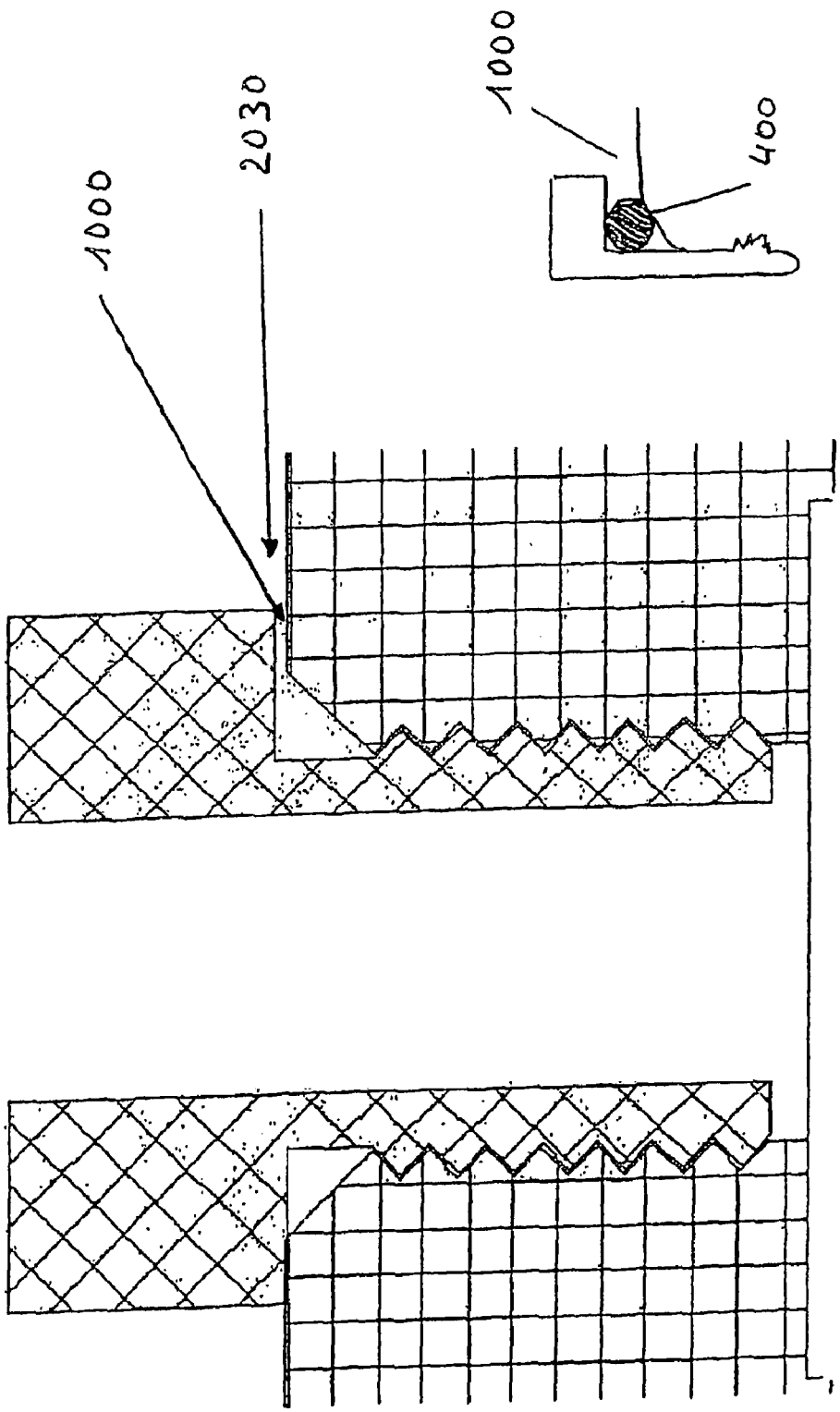
FIG. 19 shows a schematic section of a connection having a gap in male portion in accordance with an aspect of the present invention.

FIG. 17 shows a schematic section of a connection with unintended or temporary sealing surfaces (700) shown, due to missing O-ring or possibly damaged O-ring 19 in area (800). Further referring to the figures, the unintended seal (700) is formed due to lack of rubber o-ring joint (not shown). The contact areas (201, 2100) between the male and female portions of the fitting create an unintended seal (700). In the area of the defective or missing rubber O-ring (800), the part connection does not leak when tested immediately after manufacture. A hard contact point (700) between the two fittings contact areas (201, 2100) will not allow the part to leak despite the lack of the O-ring in area (800).

Referring to FIGS. 17-20, preferred embodiments of the present invention show a gap (900 or 1000) at the area of contact or 'mating surfaces' between the male and female portions of the connection (700). This gap (900, 1000) can be created by physically making a cut out, hole, punch out, or other means for removing material, or by manufacture of male and female portions to have a certain size and shape to allow for a gap or non-continuous mating surface between male and female portions when correctly assembled. The cut out, hole, punch out, distortion, or other means for removing material or shaping or forming the distortion area, leads to a discontinuous mating surface (2001, 2011) between the male and female portions of the connection (700) unlike the continuous mating portions (201, 2100) or connections with unintended or temporary seals and the area outside or external to the connection (203). By removing material, it is understood that a portion of material will be absent or not present at an area of usual contact between male and female portions such that in at least one area of either the female fitting (900) or in the male fitting (2001), the absence of material forms a channel or leak path, whereby fluid would leak if and only if no O-ring was present or if the O-ring was damaged or otherwise incorrectly manufactured at the joint. Correctly placed and undamaged O-ring leads to no leaks through leak path (1000).

In preferred methods of manufacture, the connection channel or leak path could be created through material removal, or, preferably, by intentionally creating a gap, by, for example refraining from placing material in the area of usual contact between male and female portions, during the initial manufacture of the correction portion or portions or related components, e.g. during the extrusion, casting, or other processes.

Referring to FIG. 20 is shown connection with female internal surfaces where O-ring or gasket (or other sealing means) are found. The channel or leak path is formed during the extrusion process (a gap is 'provided' or 'created'), versus current prior art processes providing for no gap (continuous surfaces) between portions and fitted or formed mating surfaces in that area. FIG. 20A-C show O-ring sealing surface (500) with gap (900) in surface to provide leak path.

The present invention, in these embodiments, results, thereby, in markedly better detection of 'non-conforming' or future 'leaking' connections or that reduces or eliminates the occurrence of 'non-conforming' or future 'leaking' assemblies reaching the customer in less than optimal condition for performance, by detecting leaks at the assembly manufacture stages. Embodiments where the heat exchanger assembly comprises at least one oil cooler or one condenser and at least one male and female portion in a fluid connection are particularly preferred.

A preferred method of the present invention is, therefore, a method for detecting defective joints or false seals in fluid assemblies or connections having a male and female portion comprising: providing a sealing means for forming a normally leak proof seal at the joint between a male and female portions; passing a test fluid through the connection which passes by the area of the normally leak proof seal at the joint; providing a leak path comprising a discontinuous mating surface for detecting false seals such as a gap, channel or groove or the like on at least one of the male or female portion mating surfaces in the area of the normally leak proof seal; and examining for evidence of test fluid leakage through the leak path indicating a defective joint, incomplete or false seal in the normally leak proof seal area.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A heat exchanger assembly, with tank to header joints with seals, the seals normally produced to be permanent seals, comprising:
   a core with a header;
   an end tank;
   a joint between the header and the end tank;
   a sealing means between the header and the end tank at the tank to header joint; and
   a means for detecting a temporary seal between the header and the end tank, wherein the means for detecting a temporary seal forms a positive leak path between the header and the end tank and wherein the means for detecting a temporary seal is a channel or groove on the header or the end tank.

2. A heat exchanger assembly as in claim 1 wherein the means for detecting a temporary seal is located on the interior surface of the header.

3. A heat exchanger assembly as in claim 1 wherein the means for detecting a temporary seal is located on the interior surface of the end tank.

4. An heat exchanger assembly as in claim 2 wherein the sealing means is a gasket.

5. A heat exchanger assembly as in claim 3 wherein the sealing means is a gasket.

6. A heat exchanger assembly as in claim 1 wherein the means for detecting a temporary seal is located on the header and the end tank.

7. A heat exchanger assembly as in claim 1, wherein the end tank further comprises a tank foot at the area of the tank to header joint.

8. A heat exchanger assembly as in claim 7 wherein the means for detecting a temporary seal is on the end tank.

9. A heat exchanger assembly as in claim 7 wherein the sealing means is made of a rubber or rubber-like material or of plastic or a plastic like material.

10. A heat exchanger assembly as in claim 9 wherein the sealing means is a gasket.

11. A heat exchanger assembly as in claim 10 wherein the means for detecting a temporary seal extends from the tank foot to the internal liquid containing environment of the tank.

12. A heat exchanger assembly as in claim 2 wherein the sealing means is made of a rubber or rubber-like material or of plastic or a plastic like material.

13. A heat exchanger assembly as in claim 3 wherein the sealing means is made of a rubber or rubber-like material or of plastic or a plastic like material.

14. A method for detecting temporary seals in heat exchanger assemblies having a core with headers and end tanks at the area of the tank to header joint comprising:
   providing a sealing means for forming a normally leak proof seal at the tank to header joint between a header and an end tank;
   passing a test fluid through the heat exchanger core which passes by the area of the normally leak proof seal at the tank to header joint;
   providing a positive leak path comprising a means for detecting temporary seals, the positive leak path including a channel or groove on the interior surface of the end tank or header in the area of the normally leak proof seal; and
   examining for evidence of test fluid leakage through the positive leak path indicating an improper, incomplete or temporary seal in the normally leak proof seal area.

15. A heat exchanger assembly, comprising:
   a heat exchanger core with a header;
   an end tank;
   a joint; and
   a fluid connection assembly, the fluid connection assembly, comprising:
      at least one male portion, at least one female portion,
      a mating surface between the at least one male portion and at least one female portion,
      a sealing means, and
      at least one channel or positive leak path for detecting a temporary or missing seal at the joint, wherein the sealing means is situated between the at least one male portion of the fluid connection assembly and the at least one female portion of the fluid connection assembly, and wherein the sealing means creates a leak tight or leak proof seal between the male and female portions when it is present.

16. An assembly as in claim 15 wherein the sealing means is an O-ring or gasket.

17. An assembly as in claim 16 wherein the male and female portions have a mating surface away from the area of the sealing means.

18. An assembly as in claim 17 wherein the male and female mating surfaces are discontinuous from the outside of the assembly to the area of the sealing means.

19. An assembly as in claim 17 wherein the male or the female mating surface has at least one channel or leak path.

20. An assembly as in claim 17 wherein a gap exists between the male mating portion surface and the female portion surface.

21. An assembly as in claim 17 wherein the male and the female mating surfaces have at least one channel or leak path.

* * * * *